US008144218B2

(12) United States Patent
Wen

(10) Patent No.: US 8,144,218 B2
(45) Date of Patent: Mar. 27, 2012

(54) IMAGE SIGNAL PROCESSING APPARATUS, IMAGE SIGNAL PROCESSING PROGRAM, AND IMAGE SIGNAL PROCESSING METHOD

(75) Inventor: Chenggang Wen, Hachioji (JP)

(73) Assignee: Olympus Corporation, Tokyo (JP)

( * ) Notice: Subject to any disclaimer, the term of this patent is extended or adjusted under 35 U.S.C. 154(b) by 350 days.

(21) Appl. No.: 12/437,135

(22) Filed: May 7, 2009

(65) Prior Publication Data

US 2009/0231460 A1 Sep. 17, 2009

Related U.S. Application Data

(63) Continuation of application No. PCT/JP2007/071089, filed on Oct. 30, 2007.

(30) Foreign Application Priority Data

Nov. 9, 2006 (JP) .................................. 2006-304426

(51) Int. Cl.
 *H04N 9/68* (2006.01)
(52) U.S. Cl. ..................................... 348/234; 348/222.1
(58) Field of Classification Search .................. 348/234, 348/235, 222.1
 See application file for complete search history.

(56) References Cited

U.S. PATENT DOCUMENTS

| 5,191,420 | A | 3/1993 | Lagoni et al. |
| 5,202,763 | A | 4/1993 | Sendelweck et al. |
| 7,027,088 | B1 * | 4/2006 | Kuwata et al. ................ 348/234 |
| 7,525,579 | B2 * | 4/2009 | Katagiri ........................ 348/234 |
| 2007/0206885 | A1 | 9/2007 | Wen |
| 2009/0041364 | A1 | 2/2009 | On |

FOREIGN PATENT DOCUMENTS

| JP | 05-064075 A | 3/1993 |
| JP | 05-183776 A | 7/1993 |
| JP | 05-308592 A | 11/1993 |
| JP | 2000-197604 A | 7/2000 |
| JP | 2001-118062 A | 4/2001 |
| JP | 2005-303802 A | 10/2005 |
| JP | 2006-098614 A | 4/2006 |
| JP | 2006-114006 A | 4/2006 |
| JP | 2006-295582 A | 10/2006 |

OTHER PUBLICATIONS

Japanese Office Action dated Mar. 16, 2010 issued in counterpart Japanese Application No. 2006-304426.
English Language International Search Report dated Dec. 11, 2007 issued in parent Appln. No. PCT/JP2007/071089.

* cited by examiner

*Primary Examiner* — Tuan Ho
(74) *Attorney, Agent, or Firm* — Holtz, Holtz, Goodman & Chick, PC

(57) ABSTRACT

An image signal processing apparatus including a first corrected tone processing section for performing such a corrected tone process which extends a tone width of a high luminance region or a low luminance region in an image signal, a tone processing section for performing a space-variant tone process for all luminance regions in the image signal, and a second corrected tone processing section for performing a corrected tone process depending on a displaying apparatus.

24 Claims, 17 Drawing Sheets

— IMAGE SIGNAL
— OTHER SIGNALS
---- CONTROL SIGNAL

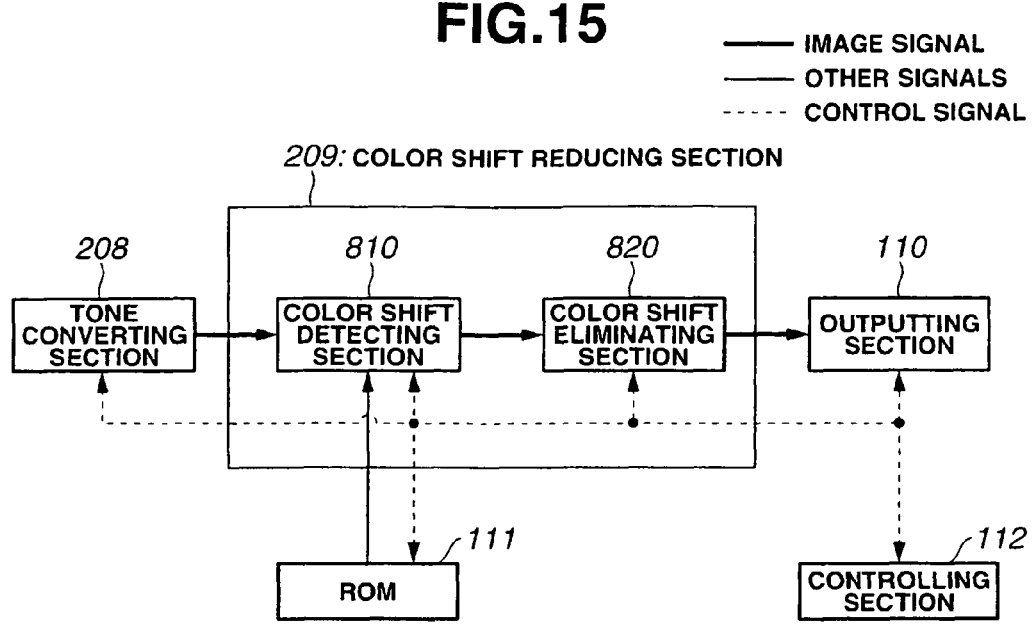
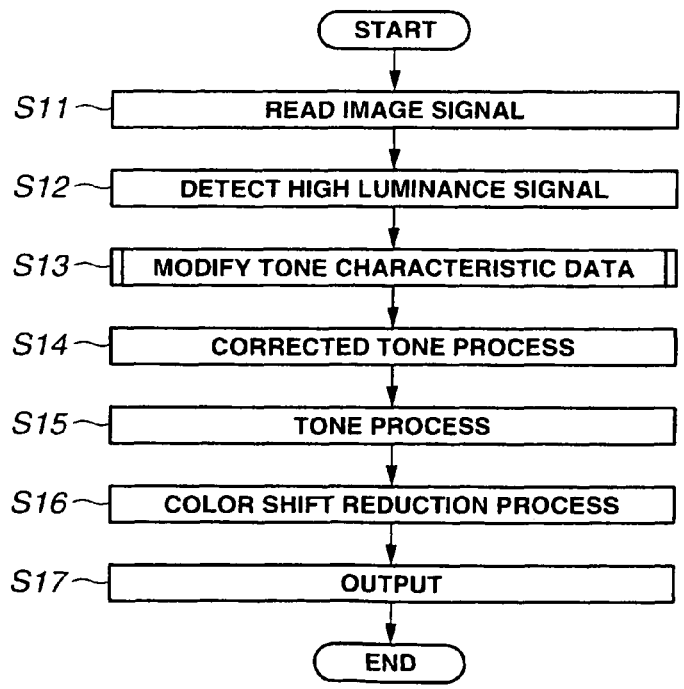

IMAGE SIGNAL PROCESSING APPARATUS, IMAGE SIGNAL PROCESSING PROGRAM, AND IMAGE SIGNAL PROCESSING METHOD

CROSS REFERENCE TO RELATED APPLICATION

This application is a continuation application of PCT/JP2007/071089 filed on Oct. 30, 2007 and claims benefit of Japanese Application No. 2006-304426 filed in Japan on Nov. 9, 2006, the entire contents of which are incorporate herein by this reference.

BACKGROUND OF THE INVENTION

1. Field of the Invention

The present invention relates to an image signal processing apparatus, an image signal processing program, and an image signal processing method for performing an image signal process for an image signal.

2. Description of the Related Art

Various image signal processes, one of which is a tone conversion process, are performed for an image signal.

If the image signal is a digitalized signal, the tone conversion process includes a process in which the number of bits varies between before and after the conversion, and a process in which the number of bits does not vary. Among the processes, for example, in the process in which the number of bits does not vary, if tone conversion is performed, a luminance region of which a tone width is extended, and a luminance region of which the tone width is compressed occur. Then, in the luminance region of which the tone width is compressed, a tone property is degraded. Particularly, whiteout occurs in a high luminance region, or blackout occurs in a low luminance region.

In response to the above, for example, Japanese Patent Application Laid-Open Publication No. 5-64075 describes a technique for obtaining a plurality of images with different exposure amounts with respect to the same shooting scene, and replacing a high luminance region in an image with a large exposure amount, with a corresponding region in an image with a small exposure amount, or a technique for replacing a low luminance region in the image with the small exposure amount, with a corresponding region in the image with the large exposure amount. In addition, usage of such techniques enables to suppress the occurrence of the region with the whiteout or the region with the blackout, and improve image quality.

Moreover, for example, Japanese Patent No. 3465226 describes a technique for analyzing a texture of an image, dividing the image into a plurality of regions based on a result of the analysis, and performing the tone conversion by using an independent tone characteristic for each region (a space-variant tone conversion technique). Thereby, even in a scene with a large light-dark ratio, the region with the whiteout or the blackout can be suppressed well.

Incidentally, Japanese Patent Application Laid-Open Publication No. 2005-303802 describes a technique for estimating a noise amount, and performing a noise reduction process based on the estimated noise amount. The noise amount estimation technique described in the above described publication does not only estimate the noise amount based on a signal level, but also, further performs the estimation for each color signal based on an ISO sensitivity which dynamically varies for each shooting.

SUMMARY OF THE INVENTION

An image signal processing apparatus according to one aspect of the present invention is an image signal processing apparatus for performing an image signal process for an image signal, including corrected tone processing means for correcting a tone characteristic so that a tone width of a specific luminance region in the image signal is extended, and tone processing means for correcting tone characteristics of all luminance regions in the image signal.

Moreover, an image signal processing program according to another aspect of the present invention is an image signal processing program for causing a computer to perform an image signal process for an image signal, the program being for causing the computer to perform a corrected tone processing step of correcting a tone characteristic so that a tone width of a specific luminance region in the image signal is extended, and a tone processing step of correcting tone characteristics of all luminance regions in the image signal.

An image signal processing method according to further another aspect of the present invention is an image signal processing method for performing an image signal process for an image signal, including a corrected tone processing step of correcting a tone characteristic so that a tone width of a specific luminance region in the image signal is extended, and a tone processing step of correcting tone characteristics of all luminance regions in the image signal.

BRIEF DESCRIPTION OF THE DRAWINGS

FIG. 15 is a block diagram showing an example of a configuration of a color shift reducing section in the above described Embodiment 2;

FIG. 16 is a flowchart showing a process by the image signal processing program of the above described Embodiment 2;

DETAILED DESCRIPTION OF THE PREFERRED EMBODIMENTS

Hereinafter, embodiments of the present invention will be described with reference to the drawings.

Embodiment 1

Figure 1:
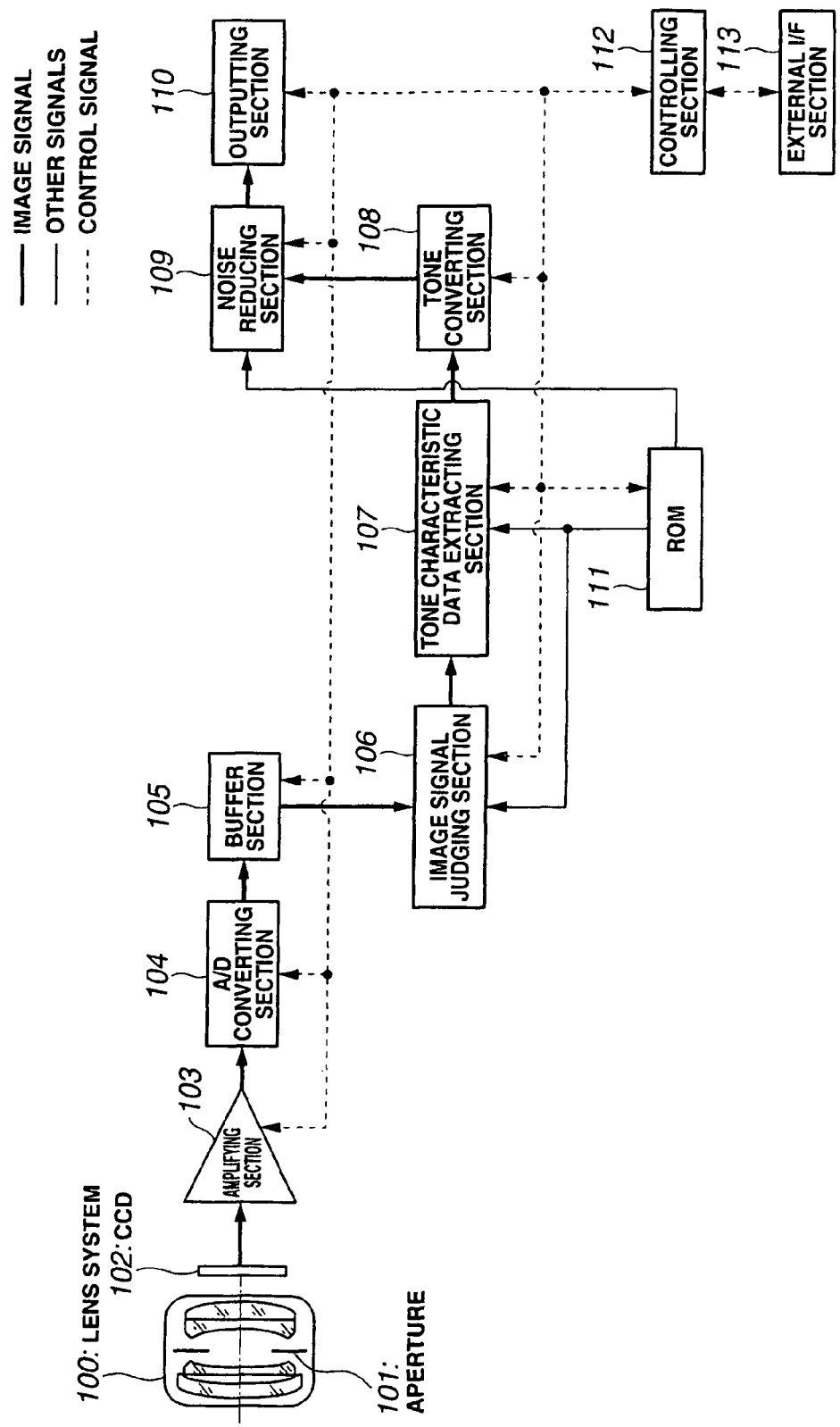
FIG. 1 is a block diagram showing a configuration of an image signal processing apparatus in Embodiment 1 of the present invention.

FIGS. 1 to 10 show Embodiment 1 of the present invention. FIG. 1 is a block diagram showing a configuration of an image signal processing apparatus.

The image signal processing apparatus is configured to have a lens system 100, an aperture 101, a CCD 102 which is an image pickup device, an amplifying section 103, an A/D converting section 104, a buffer section 105, an image signal judging section 106, a tone characteristic data extracting section 107 which is tone characteristic data extracting means, a tone converting section 108, a noise reducing section 109, an outputting section 110, a ROM 111 which is tone characteristic data saving means, a controlling section 112, and an external I/F section 113 which is threshold designating means and threshold user-designating means. In other words, the image signal processing apparatus of the present embodiment is configured as an image pickup apparatus including an image pickup section with the lens system 100, the aperture 101, the CCD 102, the amplifying section 103, the A/D converting section 104 and the like.

An analog image signal which has been shot and outputted via the lens system 100, the aperture 101 and the CCD 102 is amplified by the amplifying section 103. The analog image signal amplified by the amplifying section 103 is converted into a digital signal by the A/D converting section 104, and transferred to the buffer section 105.

The buffer section 105 is connected to the outputting section 110 via the image signal judging section 106, the tone characteristic data extracting section 107, the tone converting section 108, and the noise reducing section 109. The ROM 111 is connected to the image signal judging section 106, the tone characteristic data extracting section 107, and the noise reducing section 109.

The controlling section 112 is configured with, for example, a microcomputer or the like, and is bidirectionally connected to the amplifying section 103, the A/D converting section 104, the buffer section 105, the image signal judging section 106, the tone characteristic data extracting section 107, the tone converting section 108, the noise reducing section 109, the outputting section 110, the ROM 111, and the external I/F section 113, so as to control the sections.

Here, the external I/F section 113 is an interface including a power switch, a shutter button and the like.

Next, an operation of the image signal processing apparatus as shown in FIG. 1 will be described along a flow of the image signal.

When the shutter button is depressed via the external I/F section 113, the image signal processing apparatus which is the image pickup apparatus performs various processes related to shooting as described below.

The lens system 100 forms an optical image of a subject on an image pickup surface of the CCD 102.

The aperture 101 changes brightness of the optical image formed on the image pickup surface of the CCD 102, by defining a passing range of light flux of a subject image formed by the lens system 100.

The CCD 102 photoelectrically converts the image-formed optical image, and outputs the image as the analog image signal. The analog image signal outputted then is a signal for which known correlated double sampling or the like has been performed.

It should be noted that, in the present embodiment, a single CCD with a Bayer-type primary color filter arranged on a front face is assumed as the CCD 102. Therefore, under the assumption, the image signal outputted from the CCD 102 becomes a color image signal including three components of R (Red), G (Green) and B (Blue).

The amplifying section 103 amplifies the analog image signal from the CCD 102, based on control by the controlling section 112.

The A/D converting section 104 converts the analog image signal amplified by the amplifying section 103, into the digital image signal, and transfers the digital image signal to the buffer section 105.

The buffer section 105 stores the image signal transferred from the A/D converting section 104.

The image signal judging section 106 reads a threshold (high luminance threshold) of a high luminance image signal from the ROM 111. Then, based on the read high luminance threshold, the image signal judging section 106 determines whether or not the high luminance image signal exists in the image signal transferred from the buffer section 105, and generates a high luminance judgment result. Then, the image signal judging section 106 transfers the high luminance judgment result and the image signal to the tone characteristic data extracting section 107 (it should be noted that, in FIG. 1 and other respective block diagrams, although a signal denoted by a thick solid line includes at least an image signal, the signal may also include a signal other than the image signal.).

Based on the transferred high luminance judgment result, the tone characteristic data extracting section 107 extracts tone characteristic data conforming to the above described image signal, from the ROM 111, and transfers the extracted tone characteristic data to the tone converting section 108, along with the high luminance judgment result and the image signal.

Based on the high luminance judgment result and the transferred tone characteristic data, the tone converting section 108 performs a tone conversion process corresponding to the image signal, for the above described image signal, and transfers the processed image signal to the noise reducing section 109.

The noise reducing section 109 performs a noise reduction process for the transferred image signal, and transfers the processed image signal to the outputting section 110.

The outputting section 110 is configured to include, for example, a displaying apparatus or a recording apparatus, and performs display based on the image signal transferred from the noise reducing section 109, or performs recording in a recording medium such as a memory card.

Figure 2:
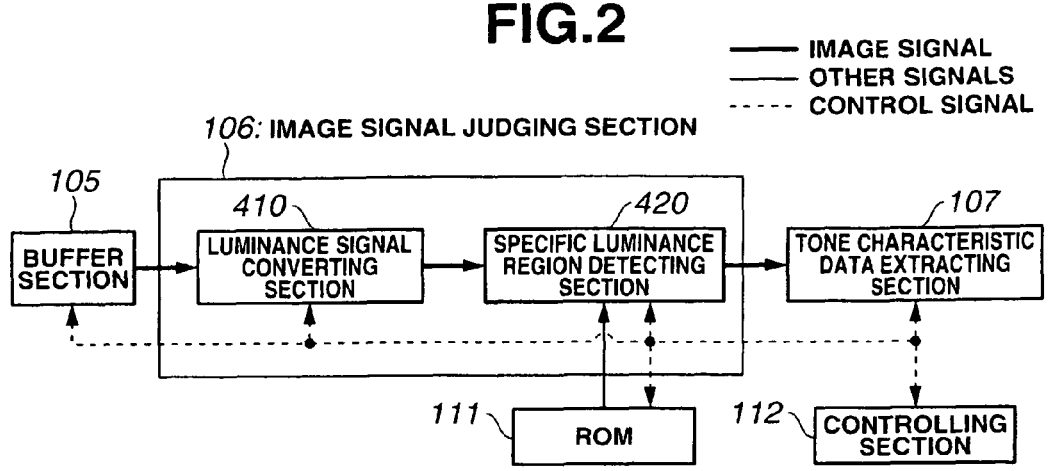
FIG. 2 is a block diagram showing an example of a configuration of an image signal judging section in the above described Embodiment 1.

Next, FIG. 2 is a block diagram showing an example of a configuration of the image signal judging section 106.

The image signal judging section 106 is configured to have a luminance signal converting section 410, and a specific luminance region detecting section 420 which is detecting means.

The buffer section 105 is connected to the tone characteristic data extracting section 107 via the luminance signal converting section 410 and the specific luminance region detecting section 420. The ROM 111 is connected to the specific luminance region detecting section 420. The controlling section 112 is bidirectionally connected to the luminance signal converting section 410 and the specific luminance region detecting section 420, so as to control the sections.

In the present embodiment, based on an RGB image signal ($R_{ij}$: R signal, $G_{ij}$: G signal, and $B_{ij}$: B signal) at a pixel position (i, j) (here, i denotes a coordinate value in a lateral direction of the image signal, and j denotes a coordinate value in a longitudinal direction of the image signal, respectively.) which is transferred in units of pixels from the buffer section 105, the luminance signal converting section 410 calculates a luminance value $K_{ij}$ for each pixel as shown in the following Formula 1.

$$K_{ij} = A1 \times R_{ij} + A2 \times G_{ij} + A3 \times B_{ij}$$ [Formula 1]

Here, A1, A2 and A3 are predetermined constants by which the R signal $R_{ij}$, the G signal $G_{ij}$, and the B signal $B_{ij}$ are multiplied respectively, when the luminance value $K_{ij}$ is calculated.

Next, the specific luminance region detecting section 420 reads the high luminance threshold for judging the high luminance image signal, from the ROM 111, and compares the read high luminance threshold with the luminance value $K_{ij}$ transferred in units of pixels from the buffer section 105. If the luminance value $K_{ij}$ is larger than the high luminance threshold, the specific luminance region detecting section 420 judges that the image signal of the above described pixel is the high luminance image signal. The specific luminance region detecting section 420 performs such comparison for all pixels included in the image, and counts the number of pixels judged as the high luminance image signal. Then, the specific luminance region detecting section 420 compares a value of a counter after all pixels have been processed, with a predetermined threshold read from the ROM 111. If the counter value is larger than the predetermined threshold, the high luminance judgment result is that the high luminance image signal exists in the image. If the counter value is less than or equal to the predetermined threshold, the high luminance judgment result is that the high luminance image signal does not exist in the image.

Subsequently, the specific luminance region detecting section 420 transfers the high luminance judgment result and the image signal to the tone characteristic data extracting section 107.

It should be noted that, in the above description, the high luminance threshold for judging the high luminance image signal has been previously stored in the ROM 111, and the specific luminance region detecting section 420 reads and uses the high luminance threshold from the ROM 111, which, however, is not restrictive, and the high luminance threshold may be able to be designated. Here, examples of means for designating the high luminance threshold include means for manually setting by a user via the external I/F section 113, and means for automatically setting based on a γ characteristic or the like of the displaying apparatus included in the outputting section 110 (or connected to the outputting section 110).

Here, as the means for manually setting, the user may manually set a desired high luminance threshold via the external I/F section 113, or the means for manually setting may be means for previously preparing a plurality of high luminance thresholds in the ROM 111 and designating any one of the high luminance thresholds by the user via the external I/F section 113.

Moreover, if the means for automatically setting the high luminance threshold is employed, it is conceivable that the specific luminance region detecting section 420 is configured as shown in the following FIG. 5.

Figure 5:
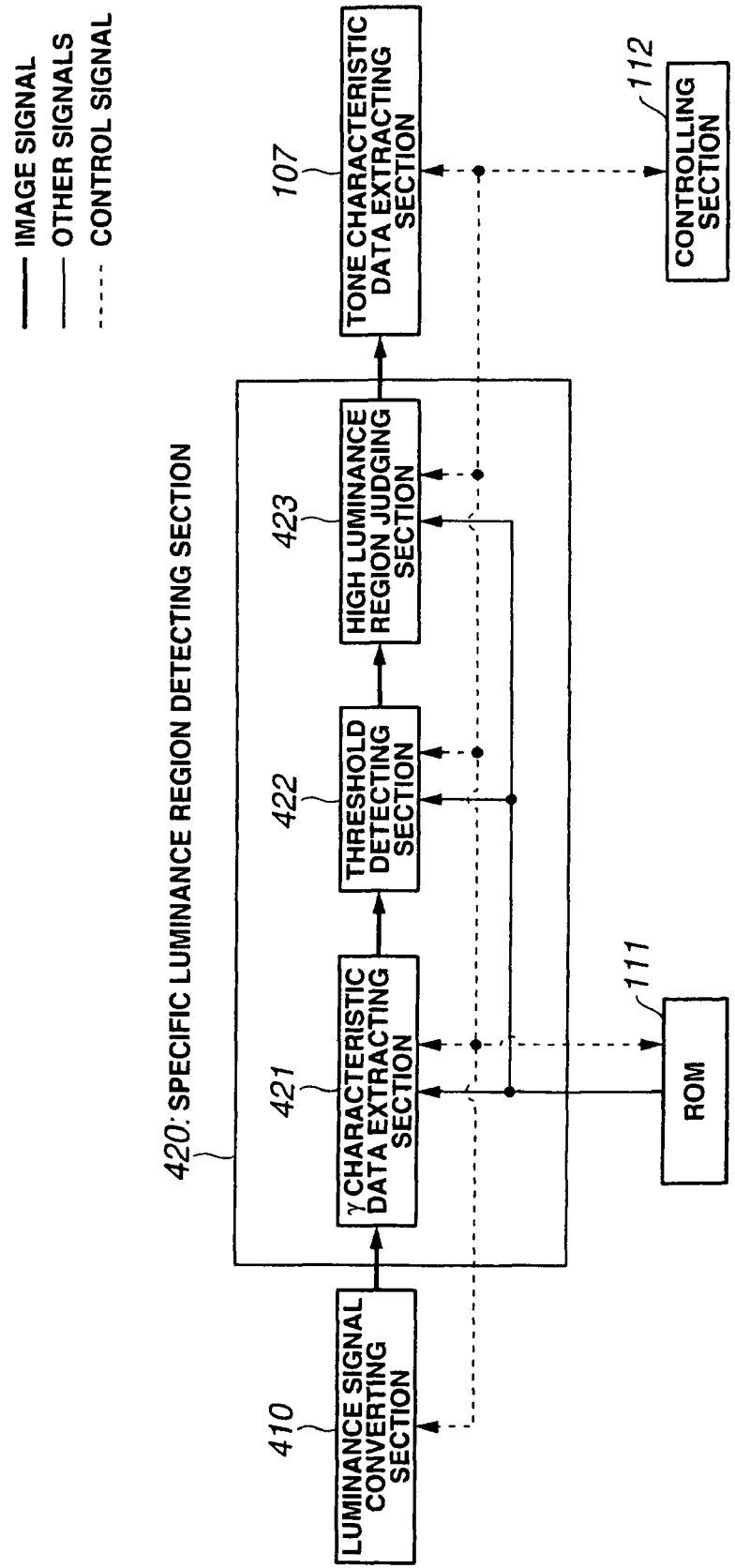
FIG. 5 is a block diagram showing an example of a configuration of a specific luminance region detecting section in the above described Embodiment 1.

FIG. 5 is a block diagram showing an example of a configuration of the specific luminance region detecting section 420.

The specific luminance region detecting section 420 is configured to have a gamma (γ) characteristic data extracting section 421, a threshold detecting section 422 which is also threshold designating means, automatic threshold designating means, analyzing means and threshold calculating means, and a high luminance region judging section 423.

The luminance signal converting section 410 is connected to the tone characteristic data extracting section 107 via the gamma characteristic data extracting section 421, the threshold detecting section 422, and the high luminance region judging section 423. The ROM 111 is connected to the gamma characteristic data extracting section 421, the threshold detecting section 422, and the high luminance region judging section 423. The controlling section 112 is bidirectionally connected to the gamma characteristic data extracting section 421, the threshold detecting section 422, and the high luminance region judging section 423, so as to control the sections.

Moreover, it is assumed that the ROM 111 has previously stored a plurality of pieces of γ characteristic data corresponding to different displaying apparatuses.

Figure 4:
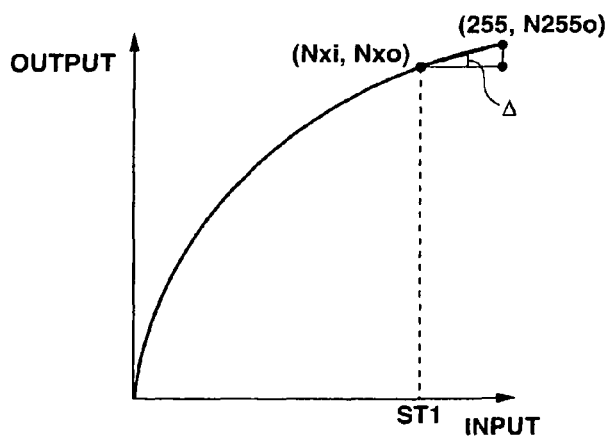
FIG. 4 is a diagram showing tone characteristic data for a second corrected tone process in the above described Embodiment 1.

When tone conversion is performed, a phenomenon may occur in which an image signal without whiteout before the conversion includes the whiteout after the conversion. A cause thereof is that, for example, if a tone conversion curve (tone curve) as shown in FIG. 4 to be described later is used, since the tone curve in a high luminance region is almost horizontal, when the image signal in the above described high luminance region is applied with the tone conversion, a variation in light and shade is almost lost after the conversion. Consequently, if a portion with a small slope on the tone conversion curve is detected, the high luminance threshold can be automatically designated.

An operation of the specific luminance region detecting section 420 shown in FIG. 5, based on such a principle, will be described.

First, based on the control by the controlling section 112, the gamma characteristic data extracting section 421 extracts γ characteristic data corresponding to a predetermined displaying apparatus included in the outputting section 110 (or connected to the outputting section 110), from the ROM 111. Then, the gamma characteristic data extracting section 421 transfers the extracted γ characteristic data, and the luminance value $K_{ij}$ from the luminance signal converting section 410, to the threshold detecting section 422.

Next, the threshold detecting section 422 reads a predetermined angle ΔTH determined as the whiteout, from the ROM 111. Then, based on the γ characteristic data from the gamma characteristic data extracting section 421 and the angle ΔTH read from the ROM 111, the threshold detecting section 422 calculates a slope angle Δ at a point of interest as described next.

Here, for example, the tone conversion from an 8-bit (256 tones) image signal into the 8-bit image signal is performed, the γ characteristic data corresponding to the displaying apparatus becomes data with 256 points corresponding to input levels of 0 to 255. It should be noted that output levels are also 0 to 255, similarly to the input levels.

Now, an x-th input level counted in ascending order is set as Nxi, an output level corresponding to the input level Nxi is set as Nxo, and (Nxi, Nxo) is set as the point of interest. Furthermore, an output level corresponding to a maximum input level 255 is set as N255o, and (255, N255o) is set as a maximum point.

Then, while the point of interest is moved in ascending order of the input level, the slope angle Δ of a line going through the point of interest and the maximum point is calculated as shown in the following Formula 2.

$$\Delta = \arctan\{(N255o - Nxo)/(255 - Nxi)\} \quad \text{[Formula 2]}$$

Then, the input level of the point of interest at the time when the slope angle Δ (Formula 2) calculated in the order according to the movement of the point of interest has first become smaller than the predetermined angle ΔTH read from the ROM 111 is set as a high luminance threshold ST1.

Subsequently, the threshold detecting section 422 transfers the detected high luminance threshold ST1, and the luminance value $K_{ij}$ transferred via the gamma characteristic data extracting section 421, to the high luminance region judging section 423.

The high luminance region judging section 423 compares the luminance value $K_{ij}$ transferred in units of pixels, with the transferred high luminance threshold ST1. If the luminance value $K_{ij}$ is larger than the high luminance threshold ST1, it is judged that the image signal of the above described pixel is the high luminance image signal.

The high luminance region judging section 423 performs such comparison for all pixels included in the image, and counts the number of pixels judged as the high luminance image signal. Then, the specific luminance region detecting section 420 compares the value of the counter after all pixels have been processed, with the predetermined threshold read from the ROM 111. If the counter value is larger than the predetermined threshold, the high luminance judgment result is that the high luminance image signal exists in the image. If the counter value is less than or equal to the predetermined threshold, the high luminance judgment result is that the high luminance image signal does not exist in the image.

Subsequently, the high luminance region judging section 423 transfers the high luminance judgment result, and the image signal transferred sequentially via the luminance signal converting section 410, the gamma characteristic data extracting section 421, and the threshold detecting section 422, to the tone characteristic data extracting section 107. Furthermore, the high luminance region judging section 423 also transfers the high luminance threshold ST1 to the tone characteristic data extracting section 107, as necessary.

The description is returned to FIG. 1. Based on the transferred high luminance judgment result, the tone characteristic data extracting section 107 extracts corrected tone characteristic data for the tone conversion process from the ROM 111. In other words, if the high luminance judgment result indicates that the high luminance image signal exists, the tone characteristic data extracting section 107 extracts tone characteristic data for a first corrected tone process for correcting the high luminance image signal, and tone characteristic data for a second corrected tone process, from the ROM 111. On the other hand, if the high luminance judgment result indicates that the high luminance image signal does not exist, the tone characteristic data extracting section 107 extracts only the tone characteristic data for the second corrected tone process from the ROM 111.

Figure 3:
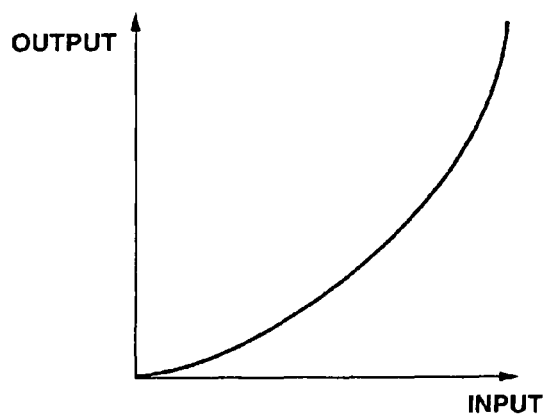
FIG. 3 is a diagram showing tone characteristic data for a first corrected tone process in the above described Embodiment 1.

Here, in the present embodiment, the tone characteristic data for the first corrected tone process is such tone characteristic data which extends a tone width of the high luminance region. The tone characteristic data for the first corrected tone process, as a specific example, is as shown in FIG. 3. Here, FIG. 3 is a diagram showing the tone characteristic data for the first corrected tone process. It should be noted that although only one kind of the tone characteristic data for the first corrected tone process can also be provided, here, it is assumed that a plurality of kinds depending on a value of the high luminance threshold ST1 are provided.

Therefore, in the ROM 111, a plurality of pieces of the tone characteristic data for the first corrected tone process corresponding to the high luminance threshold, and the tone characteristic data for the second corrected tone process have been previously stored.

Then, if the high luminance judgment result indicates that the high luminance image signal exists, the tone characteristic data extracting section 107 reads the tone characteristic data for the first corrected tone process depending on the high luminance threshold ST1 transferred from the image signal judging section 106, from the ROM 111.

It should be noted that, here, although the plurality of pieces of the tone characteristic data for the first corrected tone process which have been stored in the ROM 111 are selected based on the high luminance threshold ST1, the user may make a desired selection via the external I/F section 113. Furthermore, alternatively, the user may be able to desirably set arbitrary tone characteristic data for the first corrected tone process via the external I/F section 113.

Moreover, the tone characteristic data for the second corrected tone process is the γ characteristic data corresponding to the displaying apparatus included in the outputting section 110 (or connected to the outputting section 110). The tone characteristic data for the second corrected tone process, as a specific example, is as shown in FIG. 4. Here, FIG. 4 is a diagram showing the tone characteristic data for the second corrected tone process.

The tone characteristic data extracting section 107 transfers the extracted tone characteristic data for the second corrected tone process, and the tone characteristic data for the first-corrected tone process extracted as necessary, to the tone converting section 108, along with the image signal transferred from the image signal judging section 106.

Figure 6:
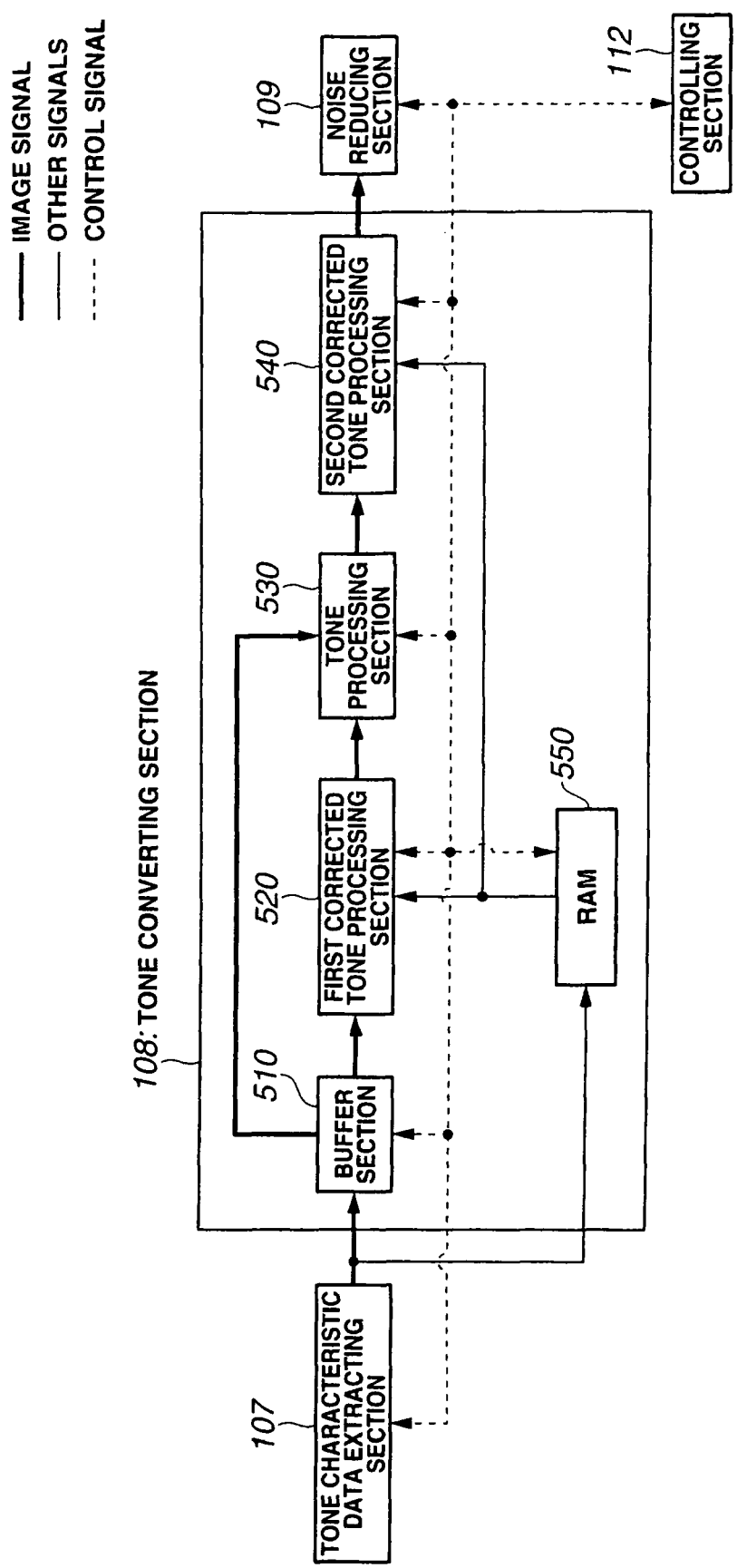
FIG. 6 is a block diagram showing an example of a configuration of a tone converting section in the above described Embodiment 1.

FIG. 6 is a block diagram showing an example of a configuration of the tone converting section 108.

The tone converting section 108 is configured to have a buffer section 510, a first corrected tone processing section 520 which is corrected tone processing means and corrected tone converting means, a tone processing section 530 which is tone processing means, a second corrected tone processing section 540 which is the corrected tone processing means, and a RAM 550.

The tone characteristic data extracting section 107 is connected to the buffer section 510 and the RAM 550. The buffer section 510 is connected to the first corrected tone processing section 520 and the tone processing section 530. The first corrected tone processing section 520 is connected to the tone processing section 530. The tone processing section 530 is connected to the noise reducing section 109 via the second corrected tone processing section 540. The RAM 550 is connected to the first corrected tone processing section 520 and the second corrected tone processing section 540.

The controlling section 112 is bidirectionally connected to the buffer section 510, the first corrected tone processing section 520, the tone processing section 530, the second corrected tone processing section 540, and the RAM 550, so as to control the sections.

The image signal from the tone characteristic data extracting section 107 is saved in the buffer section 510. Moreover, the tone characteristic data for the first corrected tone process, the tone characteristic data for the second corrected tone process, and the high luminance judgment result from the tone characteristic data extracting section 107 are saved in the RAM 550.

The tone converting section 108 extracts the high luminance judgment result from the RAM 550, based on the control by the controlling section 112. Then, if the high luminance judgment result indicates that the high luminance image signal does not exist, the tone converting section 108 transfers the image signal within the buffer section 510 to the tone processing section 530, based on the control by the controlling section 112. Moreover, if the high luminance judgment result indicates that the high luminance image signal exists, the tone converting section 108 transfers the image signal within the buffer section 510 to the first corrected tone processing section 520, based on the control by the controlling section 112.

The first corrected tone processing section 520 extracts, for example, the tone characteristic data for the first corrected tone process as shown in FIG. 3 from the RAM 550, performs the first corrected tone process for the image signal transferred from the buffer section 510, and transfers the processed image signal to the tone processing section 530. Here, the first corrected tone process is a process for extending the tone width of the high luminance region. Therefore, the tone characteristic data for the first corrected tone process has a characteristic in which a variation in the high luminance region becomes sharp, as shown in FIG. 3. However, if the tone characteristic as shown in FIG. 3 is used, while the tone width of the high luminance region is extended, a tone width of a low luminance region to a middle luminance region is necessarily compressed. Therefore, lightness and contrast in the low luminance region to the middle luminance region are degraded.

The tone processing section 530 performs a space-variant tone correction process for each pixel or for each region, for the image signal transferred from the first corrected tone processing section 520 or the buffer section 510. A specific example of the process performed by the tone processing section 530 includes such a technique described in the above described Japanese Patent No. 3465226.

Figure 7:
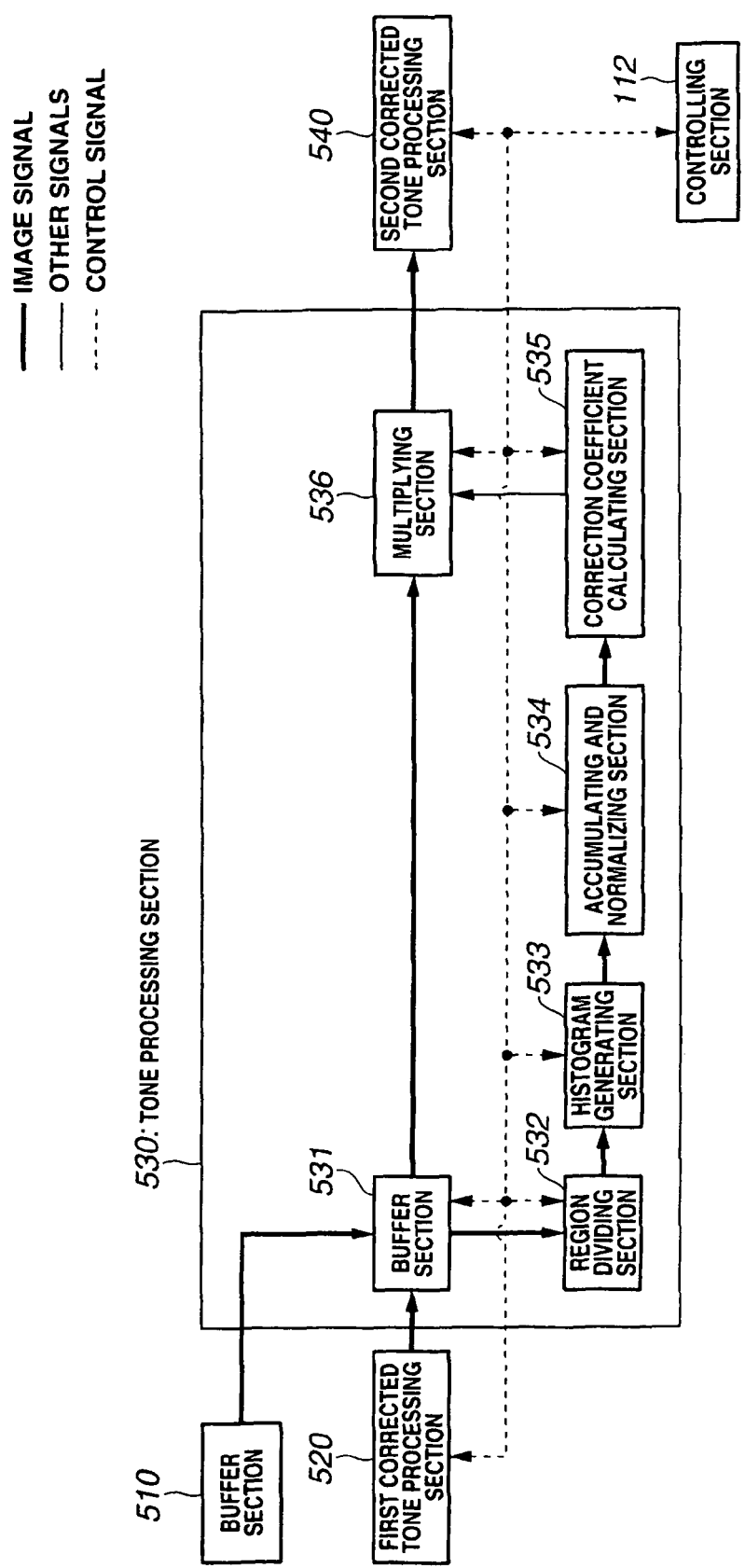
FIG. 7 is a block diagram showing an example of a configuration of a tone processing section in the above described Embodiment 1.

FIG. 7 is a block diagram showing an example of a configuration of the tone processing section 530.

The tone processing section 530 is configured to have a buffer section 531, a region dividing section 532 which is correction coefficient calculating means, a histogram generating section 533 which is the correction coefficient calculating means, an accumulating and normalizing section 534 which is the correction coefficient calculating means, a correction coefficient calculating section 535 which is the correction coefficient calculating means, and a multiplying section 536 which is tone converting means.

The buffer section 510 and the first corrected tone processing section 520 are connected to the buffer section 531. The buffer section 531 is connected to the region dividing section 532 and the multiplying section 536. The region dividing section 532 is connected to the multiplying section 536 via the histogram generating section 533, the accumulating and normalizing section 534, and the correction coefficient calculating section 535. The multiplying section 536 is connected to the second corrected tone processing section 540.

The controlling section 112 is bidirectionally connected to the buffer section 531, the region dividing section 532, the histogram generating section 533, the accumulating and normalizing section 534, the correction coefficient calculating section 535, and the multiplying section 536, so as to control the sections.

An operation of such a tone processing section 530 is as described below.

First, the image signal from the buffer section 510, or the image signal from the first corrected tone processing section 520 is saved in the buffer section 531.

Next, the region dividing section 532 performs texture analysis of the image signal transferred from the buffer section 531, and divides the image into a plurality of regions based on a result of the analysis. Then, the region dividing section 532 transfers the image signal divided into the plurality of regions, to the histogram generating section 533.

The histogram generating section 533 generates a histogram for each divided region, and transfers generated histograms to the accumulating and normalizing section 534.

The accumulating and normalizing section 534 accumulates the histograms transferred from the histogram generating section 533, further normalizes the accumulated histograms in accordance with the tone width, and thereby generates the tone conversion curve. In the present embodiment, since it is assumed that the tone width of the image signal is 8 bits, the generated tone conversion curve has an input with the tone width of 8 bits and an output with the tone width of 8 bits. The accumulating and normalizing section 534 transfers the generated tone conversion curve to the correction coefficient calculating section 535.

Based on the tone conversion curve transferred from the accumulating and normalizing section 534, the correction coefficient calculating section 535 calculates a correction coefficient $g_{ij}$ for each pixel position (i, j). The correction coefficient $g_{ij}$ is calculated by dividing an outputted value after the tone conversion, which corresponds to an inputted value for each pixel, by the above described inputted value for each pixel.

Then, the multiplying section 536 calculates an image signal $M_{ij}$ after the tone conversion by multiplying an image signal $P_{ij}$ before the tone conversion, which has been transferred for each pixel from the buffer section 531, by the correction coefficient $g_{ij}$ transferred for each pixel from the correction coefficient calculating section 535, as shown in the following Formula 3.

$$M_{ij} = P_{ij} \times g_{ij} \quad \text{[Formula 3]}$$

The multiplying section 536 outputs the image signal $M_{ij}$ after the tone conversion, which has been calculated as described above, to the second corrected tone processing section 540.

As a result of performing such a process by the tone processing section 530, the lightness and the contrast in the low luminance region to the middle luminance region, which have been degraded due to the tone correction by the first corrected tone processing section 520, are improved to a level which nearly corresponds to a state where the first corrected tone process is not performed. Furthermore, as a result of such a process, the tone width of the high luminance region is extended more than in the case where the first corrected tone process is not performed, that is, the whiteout is suppressed.

The description is returned to FIG. 6. The second corrected tone processing section 540 extracts, for example, the tone characteristic data for the second corrected tone process as shown in FIG. 4, from the RAM 550, performs the second corrected tone process for the image signal transferred from the tone processing section 530, and transfers the processed image signal to the noise reducing section 109. Here, the second corrected tone process is for canceling the γ characteristic of the displaying apparatus. The tone characteristic data for the second corrected tone process is generally an inverse characteristic of a tone reproduction characteristic of the displaying apparatus. It should be noted that a characteristic shown in FIG. 4 is a typical example of a tone characteristic for the second corrected tone process.

The subsequent noise reducing section 109 calculates a noise amount which is estimated to be included in the image signal transferred from the second corrected tone processing section 540, and performs the noise reduction process for the above described image signal. Here, the noise reducing section 109 estimates the noise amount and performs the noise reduction process by using, for example, such a known art described in the above described Japanese Patent Application Laid-Open Publication No. 2005-303802.

Figure 8:
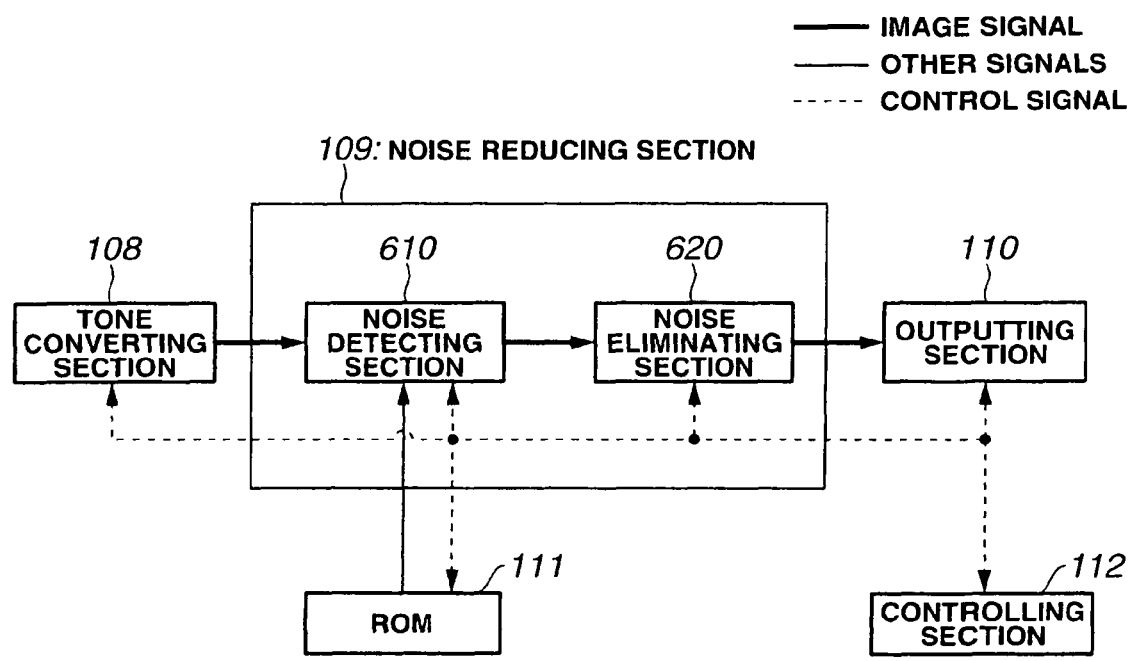
FIG. 8 is a block diagram showing an example of a configuration of a noise reducing section in the above described Embodiment 1.

FIG. 8 is a block diagram showing an example of a configuration of the noise reducing section 109.

The noise reducing section 109 is configured to have a noise detecting section 610 which is image quality degradation information obtaining means and noise detecting means, and a noise eliminating section 620 which is image quality correcting means and noise reducing means.

The tone converting section 108 is connected to the outputting section 110 via the noise detecting section 610 and the noise eliminating section 620. The ROM 111 is connected to the noise detecting section 610. The controlling section 112 is bidirectionally connected to the noise detecting section 610 and the noise eliminating section 620, so as to control the sections.

The noise detecting section 610 extracts a noise model corresponding to a shooting condition or the like at the time when the image has been picked up, from the ROM 111. The noise model is a model indicating a relationship between a signal value of the image signal (particularly, a signal value of a luminance signal) and the noise amount corresponding to the above described signal value. In addition, the shooting condition is, for example, an amplifying rate (corresponding to an ISO sensitivity) in the amplifying section 103, or a white balance coefficient in the case where a white balance process has been performed, or further, a temperature of the CCD 102 at the time when the image has been shot, or the like.

Next, based on the extracted noise model, the noise detecting section 610 calculates the noise amount of the image signal transferred for each pixel from the tone converting section 108. The noise detecting section 610 transfers the noise amount calculated as described above, and the image signal, to the noise eliminating section 620.

The noise eliminating section 620 uses the transferred noise amount for each pixel to perform the noise reduction process for the image signal for each pixel. The noise eliminating section 620 further also performs a process for converting the image signal after the noise reduction into the RGB. The noise eliminating section 620 transfers the RGB image signal obtained as described above to the outputting section 110.

It should be noted that, in the above description, although the image signal processing apparatus having a configuration in which the image pickup section including the lens system 100, the aperture 101, the CCD 102, the amplifying section 103, and the A/D converting section 104 are integrated is described, the image signal processing apparatus is not required to be limited to such a configuration, and the image pickup section may be separated. In other words, an image signal processing apparatus which reads an image signal picked up by the separate image pickup section and recorded in a form of unprocessed RAW data, in the recording medium such as a memory card, from the above described recording medium, and processes the image signal, is possible. However, then, it is assumed that information (the ISO sensitivity, the white balance coefficient and the like) at the time of the shooting has been recorded in a header section or the like. It should be noted that transmission of various kinds of information from the separate image pickup section to the image signal processing apparatus is not limited to be performed via the recording medium, and may be performed via a communication line or the like.

Furthermore, in the above description, a process by hardware has been premised, which, however, is not required to be limited to such a configuration. For example, the signal from the CCD 102 is recorded as the RAW data which has still been unprocessed, in the recording medium such as a memory card, and also, the information (the ISO sensitivity, the white balance coefficient and the like) at the time of the shooting from the controlling section 112 is previously recorded as header information in the recording medium. Then, it is also possible to cause a computer to execute an image signal processing program which is separate software, cause the computer to read the information in the recording medium, and perform the process. It should be noted that transmission of the various kinds of information from the image pickup section to the computer is not limited to be performed via the recording medium, and may be performed via the communication line or the like, similarly to the above description.

Figure 9:
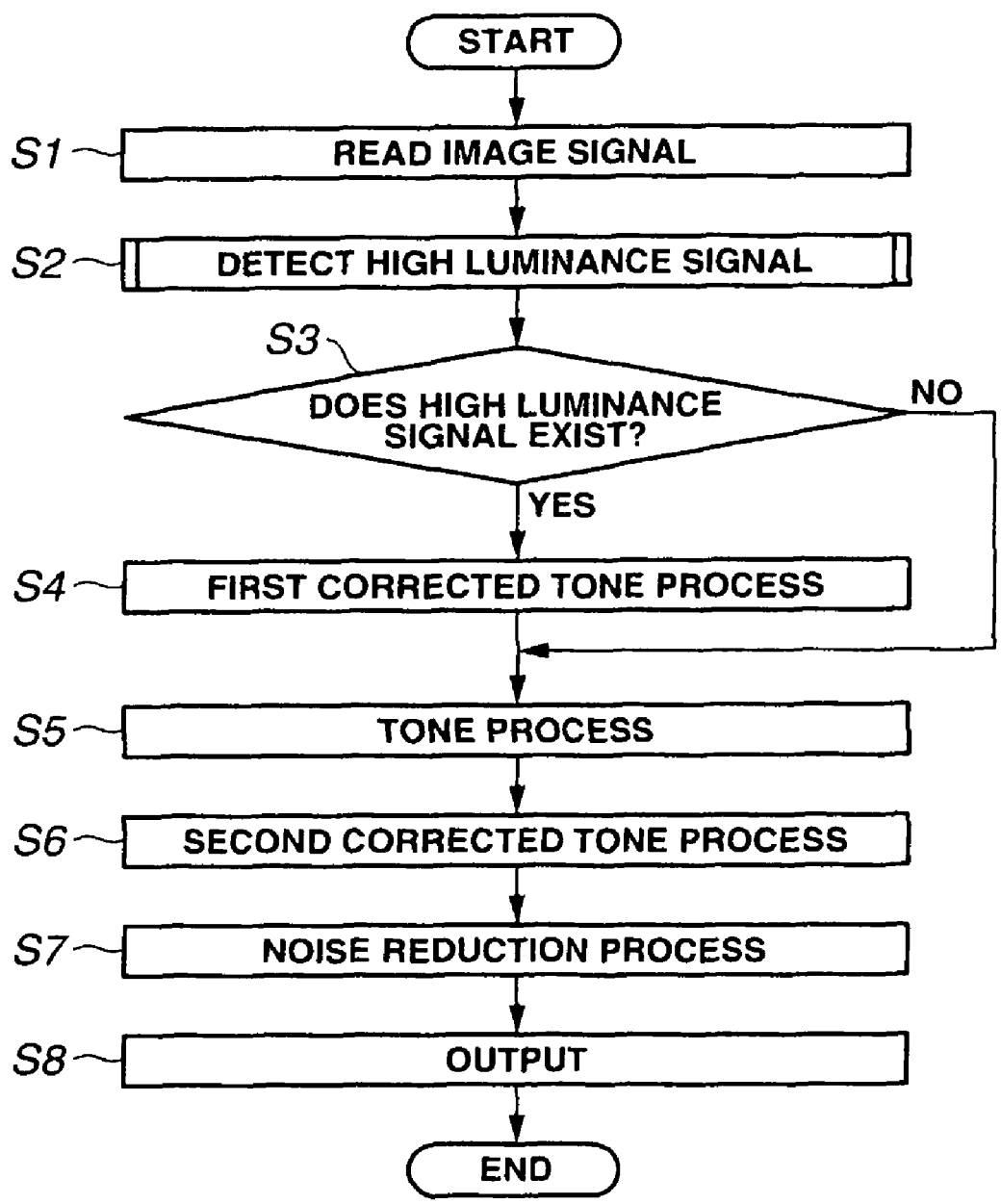
FIG. 9 is a flowchart showing a process by an image signal processing program of the above described Embodiment 1.

FIG. 9 is a flowchart showing a process by the image signal processing program.

When the process is started, first, the image signal, the above described header information and the like are read, and also, the information on the tone characteristic data and the like which has been previously provided in the above described image signal processing program is read (step S1). The process corresponds to a process for shooting the subject and obtaining the image signal in the image signal processing apparatus which is the image pickup apparatus.

Next, detection of the high luminance image signal in the image signal is performed (step S2).

Subsequently, based on a result of the detection in step S2, it is determined whether or not the high luminance image signal exists in the image signal (step S3).

Here, if it has been determined that the high luminance image signal exists, the tone characteristic data for the first corrected tone process is selected, and based on the selected tone characteristic data, the first corrected tone process is performed for the image signal (step S4).

If the process in step S4 is completed, or it has been determined in step S3 that the high luminance image signal does not exist, the correction coefficient for a space-variant tone conversion process is calculated for each pixel or for each region by using the image signal, the image signal for which the process in step S4 has been performed is multiplied by the correction coefficient, and thereby the space-variant tone conversion process is performed (step S5).

Next, the tone characteristic data for the second corrected tone process is selected, and based on the selected tone characteristic data, the second corrected tone process is performed for the image signal (step S6).

Therefore, if it has been determined in step S3 that the high luminance signal exists, the first corrected tone process and the second corrected tone process are performed. On the other hand, if it has been determined that the high luminance image signal does not exist, only the second corrected tone process is performed.

Subsequently, the known noise reduction process is performed (step S7).

Subsequently, after the image signal after the noise reduction is outputted, and displayed on the displaying apparatus, or saved in the memory card or the like (step S8), the process is completed.

Figure 10:
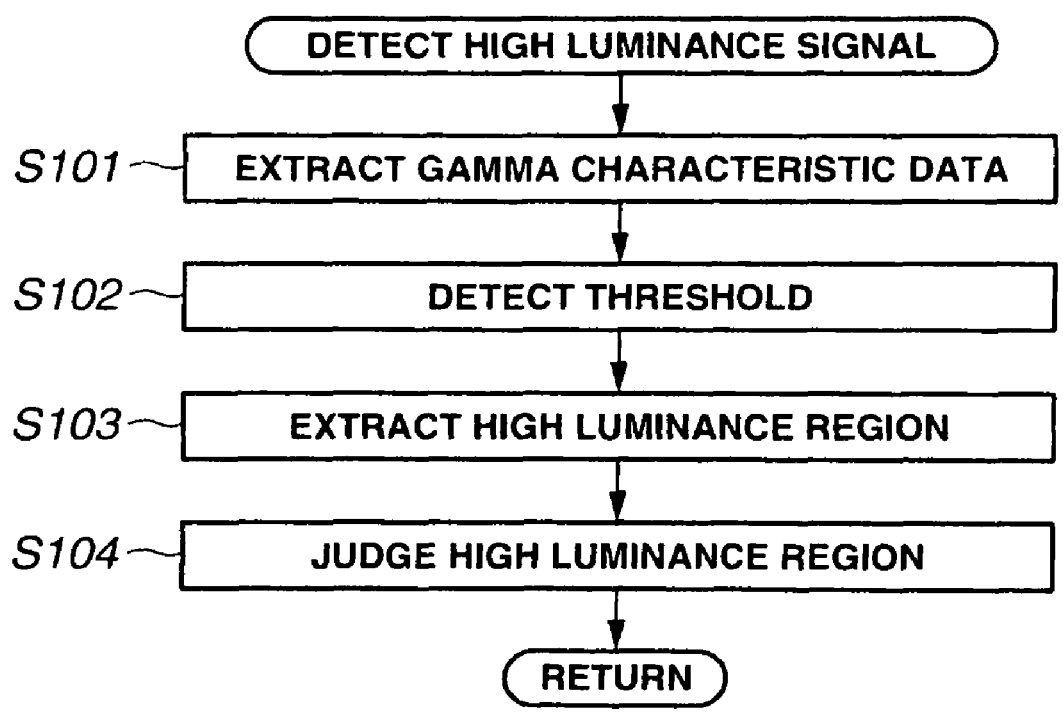
FIG. 10 is a flowchart showing details of a high luminance signal detection process in step S2 of FIG. 9, in the above described Embodiment 1.

Next, FIG. 10 is a flowchart showing details of the high luminance signal detection process in step S2 of FIG. 9. The process shown in FIG. 10 corresponds to the process performed in the above described specific luminance region detecting section 420.

When the process is started, first, the γ characteristic data corresponding to the predetermined displaying apparatus is extracted (step S101).

Next, as shown in FIG. 4, the input level at the time when the slope angle Δ (Formula 2) corresponding to the γ characteristic data has first become smaller than the predetermined angle ΔTH recognized as the whiteout is set as the high luminance threshold (ST1 shown in FIG. 4) (step S102).

Subsequently, the luminance values of all pixels included in the image are compared with the high luminance threshold, and the number of pixels with the luminance value larger than the high luminance threshold (the pixels judged as the high luminance image signal) is counted (step S103).

Then, the count number of the high luminance image signal is compared with the predetermined threshold. If the count number of the high luminance image signal is larger than the predetermined threshold, it is judged that the high luminance image signal exists in the image. On the other hand, if the count number of the high luminance image signal is smaller than the predetermined threshold, it is judged that the high luminance image signal does not exist in the image (step S104).

If the process in step S104 is completed, subsequently, the process returns to the process shown in FIG. 9.

It should be noted that, although an example of automatically setting the high luminance threshold has been described here, the setting may be manually performed by a user input. Then, instead of processes in step S101 and step S102 of FIG. 10, a process for manually inputting the high luminance threshold may be performed.

Moreover, a technique as described above is applicable to both the case where the image signal is a still image signal and the case where the image signal is a moving image signal.

In addition, in the above description, the image signal processing apparatus and the image signal processing program have been described, which, however, are not restrictive, and may be an image signal processing method for performing the process as described above.

According to Embodiment 1 as described above, the first corrected tone process for extending the tone width of the high luminance region is performed, and subsequently, the space-variant tone conversion process is performed. Thus, while the state where the tone of the high luminance region has been extended is retained, the tone in the low luminance region to the middle luminance region, in which the tone has been compressed in the first corrected tone process, can be extended so as to be returned to an almost original state. Furthermore, subsequently, the tone correction in which the tone reproduction characteristic of the displaying apparatus has been reflected is performed as the second corrected tone process. Thus, an appropriate image in which the tone width of the high luminance region has been extended can be observed in the displaying apparatus.

As described above, occurrence of the whiteout in the high luminance region can be reduced, and image quality can be improved.

Furthermore, the tone curve used for the first corrected tone process can be selected from the plurality of kinds or desirably set. Thus, a degree of the improvement of the image quality can be controlled.

Moreover, if the high luminance threshold is automatically set, the manual setting is not required, which leads to an image signal processing apparatus which can be easily operated.

Embodiment 2

Figure 11:
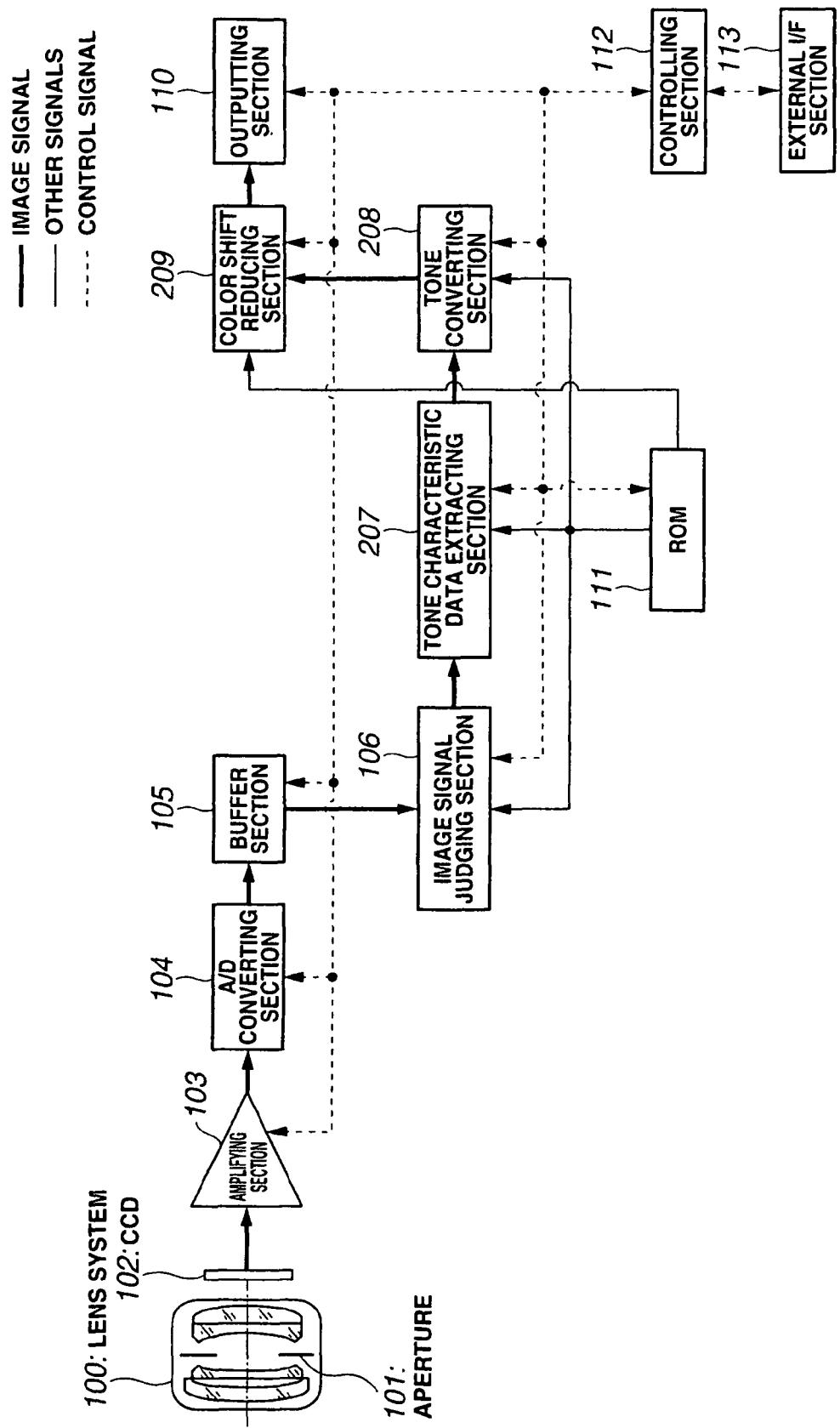
FIG. 11 is a block diagram showing a configuration of the image signal processing apparatus in Embodiment 2 of the present invention.

FIGS. 11 to 17 show Embodiment 2 of the present invention. FIG. 11 is a block diagram showing a configuration of the image signal processing apparatus.

In the Embodiment 2, the same reference numerals are attached to sections similar to the above described Embodiment 1, descriptions thereof are omitted, and mainly, only different points will be described.

The Embodiment 2 has a configuration in which, in the image signal processing apparatus shown in FIG. 1 of Embodiment 1, the tone characteristic data extracting section 107 is replaced with a tone characteristic data extracting section 207 which is the tone characteristic data extracting means and adjustment rate extracting means, the tone converting section 108 is replaced with a tone converting section 208, and the noise reducing section 109 is replaced with a color shift reducing section 209, respectively. Moreover, the external I/F section 113 in the present embodiment is also adjustment rate user-designating means. Other basic configuration is similar to the above described Embodiment 1. For example, the configuration of the image signal judging section 106 is similar to the configuration shown in FIG. 2.

The image signal judging section 106 is connected to the outputting section 110 via the tone characteristic data extracting section 207, the tone converting section 208, and the color shift reducing section 209. The ROM 111 is connected to the image signal judging section 106, the tone characteristic data extracting section 207, the tone converting section 208, and the color shift reducing section 209.

The controlling section 112 is bidirectionally connected to the tone characteristic data extracting section 207, the tone converting section 208, and the color shift reducing section 209, so as to control the sections.

Next, an operation of the image signal processing apparatus as shown in FIG. 11 will be described along the flow of the image signal.

When the shutter button is depressed via the external I/F section 113, the image is picked up by the lens system 100, the aperture 101 and the CCD 102, and the image signal is outputted, amplified by the amplifying section 103, and converted into the digital signal by the A/D converting section 104.

The buffer section 105 stores the image signal transferred from the A/D converting section 104.

The image signal judging section 106 reads the threshold (high luminance threshold) of the high luminance image signal, for example, from the ROM 111. Then, based on the read high luminance threshold, the image signal judging section 106 determines whether or not the high luminance image signal exists in the image signal transferred from the buffer section 105, and generates the high luminance judgment result. Then, the image signal judging section 106 transfers the high luminance judgment result and the image signal to the tone characteristic data extracting section 207.

The tone characteristic data extracting section 207 extracts the γ characteristic data corresponding to the predetermined displaying apparatus from the ROM 111. Furthermore, if the high luminance judgment result indicates that the high luminance image signal exists, the tone characteristic data extracting section 207 extracts an adjustment rate for modifying the tone characteristic data, from the ROM 111. Then, the tone characteristic data extracting section 207 transfers the γ characteristic data, the high luminance judgment result, the image signal, and the adjustment rate as necessary, to the tone converting section 208.

The tone converting section 208 modifies the transferred tone characteristic data, and based on the modified tone characteristic data, performs the tone conversion process corresponding to the image signal, for the above described image signal, and transfers the processed image signal to the color shift reducing section 209.

The color shift reducing section 209 performs a color shift reduction process for the transferred image signal, and transfers the processed image signal to the outputting section 110.

The outputting section 110 performs the display on the displaying apparatus based on the image signal transferred from the color shift reducing section 209, or performs the recording in the recording medium such as a memory card, with the recording apparatus.

Figure 12:
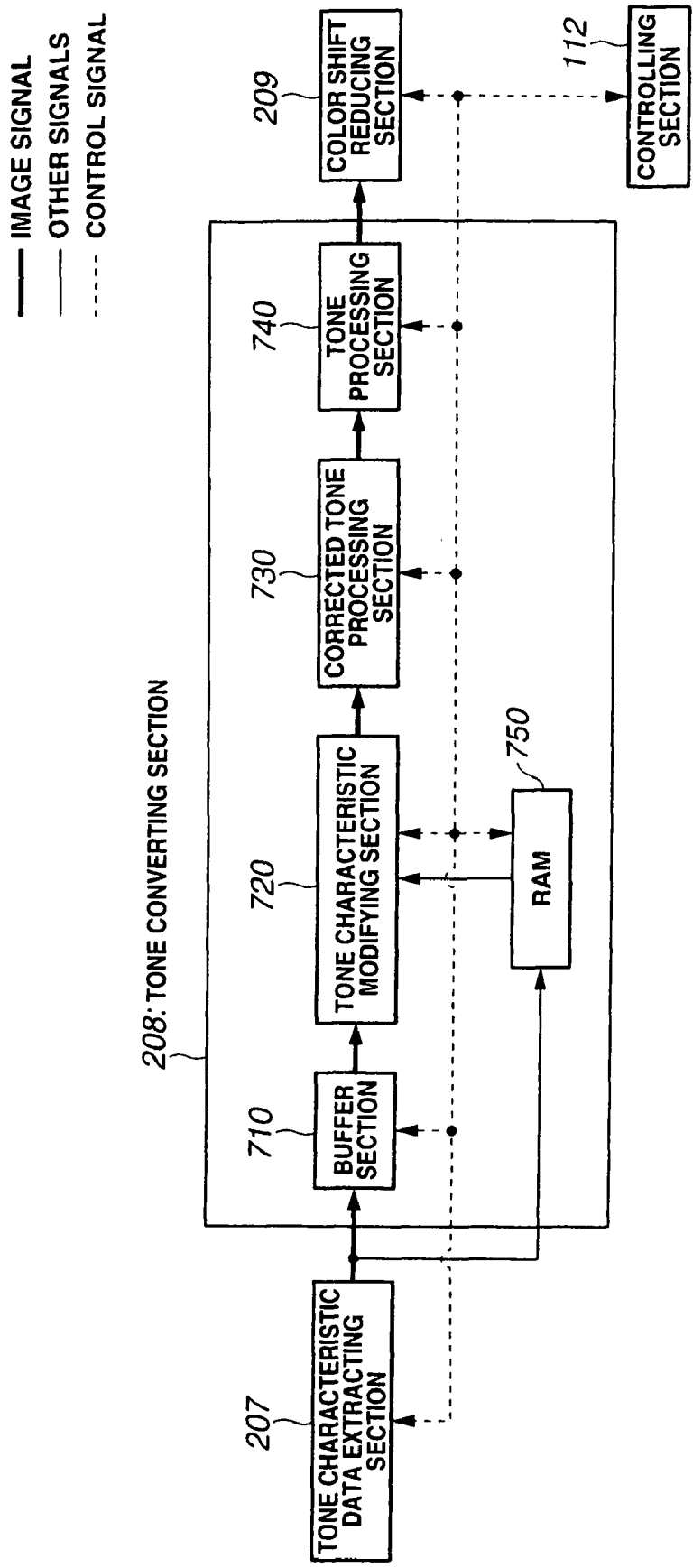
FIG. 12 is a block diagram showing an example of a configuration of the tone converting section in the above described Embodiment 2.

Next, FIG. 12 is a block diagram showing an example of a configuration of the tone converting section 208.

The tone converting section 208 is configured to have a buffer section 710, a tone characteristic modifying section 720 which is tone characteristic modifying means and the adjustment rate extracting means, a corrected tone processing section 730 which is the corrected tone processing means and the corrected tone converting means, a tone processing section 740 which is the tone processing means, and a RAM 750.

The tone characteristic data extracting section 207 is connected to the buffer section 710 and the RAM 750. The buffer section 710 is connected to the color shift reducing section 209 via the tone characteristic modifying section 720, the corrected tone processing section 730, and the tone processing section 740. The RAM 750 is connected to the tone characteristic modifying section 720.

The controlling section 112 is bidirectionally connected to the buffer section 710, the tone characteristic modifying section 720, the corrected tone processing section 730, the tone processing section 740, and the RAM 750, so as to control the sections.

An operation of such a tone converting section 208 is as follows.

First, the image signal from the tone characteristic data extracting section 207 is saved in the buffer section 710. Moreover, the γ characteristic data, the high luminance judgment result, and the adjustment rate from the tone characteristic data extracting section 207 are saved in the RAM 750.

Next, the tone characteristic modifying section 720 reads the high luminance judgment result, and the γ characteristic data corresponding to the displaying apparatus, from the RAM 750. Then, if the high luminance judgment result indicates that the high luminance image signal exists, the tone characteristic modifying section 720 further reads the adjustment rate from the RAM 750 based on the control by the controlling section 112, and modifies the tone characteristic data based on the adjustment rate.

Figure 13:
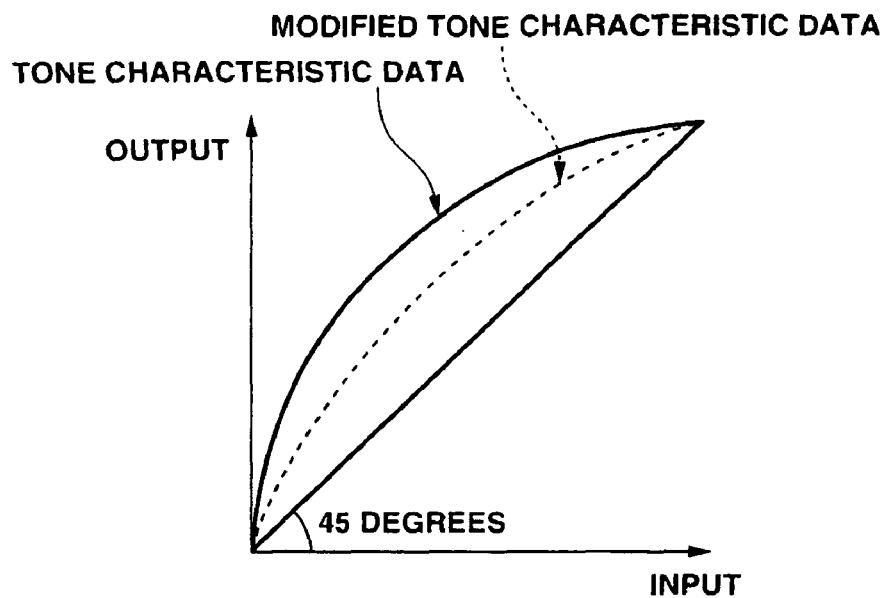
FIG. 13 is a diagram showing a situation where a tone characteristic to be used in a corrected tone process is modified, in the above described Embodiment 2.

A process for modifying the tone characteristic data by the tone characteristic modifying section 720 will be further described with reference to FIG. 13. Here, FIG. 13 is a diagram showing a situation where the tone characteristic to be used in the corrected tone process is modified. It should be noted that, in the FIG. 13, it is assumed that the number of bits of an inputted image signal and the number of bits of an outputted image signal are the same.

The tone characteristic modifying section 720 reads the tone characteristic data shown as a curve of a solid line in FIG. 13 (which is the γ characteristic data corresponding to the displaying apparatus, and is set as G( ). It should be noted that the tone characteristic data is similar to the tone characteristic data shown in FIG. 4 of Embodiment 1.) from the RAM 750, and also reads the adjustment rate Rate (0≦Rate≦1) from the RAM 750.

Then, the tone characteristic modifying section 720 calculates outputted data OutData, from inputted data InputData, as shown in the following Formula 4.

$$OutData = (G(InputData) - InputData) \times Rate + InputData \quad \text{[Formula 4]}$$

The calculation calculates a difference between the tone characteristic data shown as the curve of the solid line, and linear correction data shown as a straight line with a slope of 45 degrees, multiplies the calculated difference by the adjustment rate Rate, and further adds the inputted data, as shown in FIG. 13. In other words, the tone characteristic data, which has been moved closer to the linear correction data including the straight line with the slope of 45 degrees (the tone conversion curve for which the tone conversion is not performed) by an amount depending on the adjustment rate Rate, is set as the modified tone characteristic data (shown as a curve of a dotted line in FIG. 13.).

Since a compression rate of the tone in the high luminance region can be reduced by performing such a process, the degradation in the contrast (the occurrence of the whiteout) in the high luminance region can be suppressed.

It should be noted that, in the above description, the adjustment rate Rate has been previously stored in the ROM 111, and the tone characteristic data extracting section 207 reads the adjustment rate Rate from the ROM 111, and transfers the adjustment rate Rate to the tone characteristic modifying section 720 via the RAM 750, which, however, is not restrictive. The tone characteristic modifying section 720 itself may function as automatic adjustment rate designating means, and calculate the adjustment rate Rate based on the image signal.

For example, it is conceivable that, based on a ratio of an area of the high luminance region to an area of the entire image, or a ratio of the number of pixels determined as the high luminance region to the number of pixels in the entire image, the tone characteristic modifying section 720 calculates the adjustment rate Rate. Then, the image signal judging section 106 not only determines whether or not the high luminance image signal exists in the image signal, but also outputs information on the number of pixels determined as the high luminance signal (or the area of the high luminance region).

Figure 14:
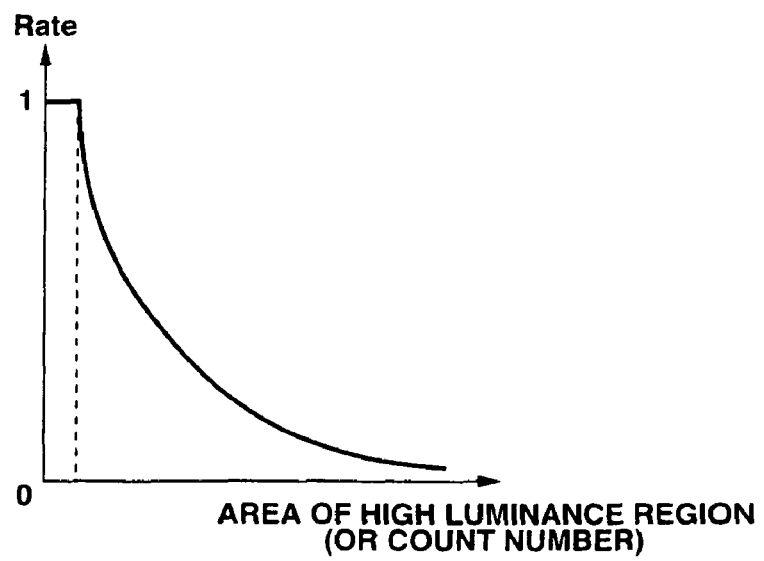
FIG. 14 is a diagram showing an example of a relationship between an adjustment rate and an area of a high luminance image signal, in the above described Embodiment 2.

In addition, it is conceivable that the adjustment rate Rate varies, for example, as shown in FIG. 14. Here, FIG. 14 is a diagram showing an example of a relationship between the adjustment rate and an area of the high luminance image signal.

In other words, the adjustment rate Rate is "1" until the count number of the pixels determined as the high luminance region (or the area of the high luminance region) reaches the predetermined threshold for determining whether or not the high luminance image signal exists in the image. Then, as the above described count number (or the area of the high luminance region) becomes larger beyond the predetermined threshold, the adjustment rate Rate monotonically decreases.

Furthermore, the setting of the adjustment rate Rate is not restrictive, and may be able to be performed by the user via the external I/F section 113. Then, the user may set a desired value, or several candidates for the adjustment rate Rate have been previously prepared in the ROM 111, and any of the candidates may be selected by a user input.

If the high luminance image signal exists, the tone characteristic modifying section 720 modifies the tone characteristic data as described above, and subsequently, transfers the modified tone characteristic data, the high luminance judgment result, and the image signal, to the corrected tone processing section 730.

On the other hand, if the high luminance image signal does not exist, the tone characteristic modifying section 720 transfers unchanged γ characteristic data (the tone characteristic data), the high luminance judgment result, and the image signal, to the corrected tone processing section 730, without modifying the γ characteristic data corresponding to the displaying apparatus.

Based on the high luminance judgment result, the tone characteristic data, and the image signal, which have been transferred, the corrected tone processing section 730 performs the corrected tone process.

In other words, if the high luminance image signal exists, the corrected tone processing section 730 uses the modified tone characteristic data to perform the corrected tone process for the image signal.

Moreover, if the high luminance image signal does not exist, the corrected tone processing section 730 uses the γ characteristic data corresponding to the displaying apparatus to perform the corrected tone process for the image signal.

Then, the corrected tone processing section 730 transfers the image signal after the corrected tone process, to the tone processing section 740.

Subsequently, similarly to the tone processing section 530 of the above described Embodiment 1, the tone processing section 740 performs the space-variant tone correction process for the image signal transferred from the corrected tone processing section 730, and transfers the processed image signal to the color shift reducing section 209.

The color shift reducing section 209 performs a known chroma suppression process (the color shift reduction process) for the image signal from the tone converting section 208 as described above. Here, FIG. 15 is a block diagram showing an example of a configuration of the color shift reducing section 209.

The color shift reducing section 209 is configured to have a color shift detecting section 810 which is the image quality degradation information obtaining means and color shift detecting means, and a color shift eliminating section 820 which is the image quality correcting means and color shift reducing means.

The tone converting section 208 is connected to the outputting section 110 via the color shift detecting section 810 and the color shift eliminating section 820. The ROM 111 is connected to the color shift detecting section 810. The controlling section 112 is bidirectionally connected to the color shift detecting section 810 and the color shift eliminating section 820, so as to control the sections.

The color shift detecting section 810 converts the RGB image signal transferred from the tone converting section 208, into a YCrCb image signal first. Then, the color shift detecting section 810 calculates a chroma suppression gain with respect to a luminance signal Y. Subsequently, the color shift detecting section 810 transfers the YCrCb image signal and the chroma suppression gain to the color shift eliminating section 820.

Next, the color shift eliminating section 820 uses the chroma suppression gain to perform the chroma suppression process with respect to color-difference signals Cr and Cb, converts a CrCb signal after the chroma suppression process and the luminance signal Y into the RGB image signal again, and transfers the RGB image signal to the outputting section 110.

It should be noted that, also in the present embodiment, similarly to the above described Embodiment 1, the image signal processing apparatus in which the image pickup section is separate is possible, the image signal processing method is possible, or the computer may be caused to execute the image signal processing program to perform a similar process.

FIG. 16 is a flowchart showing a process by the image signal processing program.

When the process is started, first, similarly to step S1 of FIG. 9, the image signal and the information on the tone characteristic data and the like are read (step S11).

Next, similarly to step S2 of FIG. 9, detection of the high luminance image signal in the image signal is performed (step S12).

Subsequently, the tone characteristic data is modified by using the adjustment rate (step S13). However, the modification of the tone characteristic data is performed if it is determined that the high luminance image signal exists, based on a result of the detection in step S12. If it is determined that the high luminance image signal does not exist, the modification process is not performed here.

Then, if it has been determined that the high luminance image signal exists, the modified tone characteristic data is used, or on the other hand, if it has been determined that the high luminance image signal does not exist, unmodified tone characteristic data is used, to perform the corrected tone process (step S14).

Furthermore, similarly to step S5 of FIG. 9, the correction coefficient for the space-variant tone conversion process is calculated for each pixel or for each region by using the image signal, the image signal for which the process in step S14 has been performed is multiplied by the correction coefficient, and thereby the space-variant tone conversion process is performed (step S15).

Next, the known color shift reduction process is performed for the image signal after the tone conversion process (step S16).

Subsequently, after the image signal after the color shift reduction is outputted, and displayed on the displaying apparatus, or saved in the memory card or the like (step S17), the process is completed.

Figure 17:
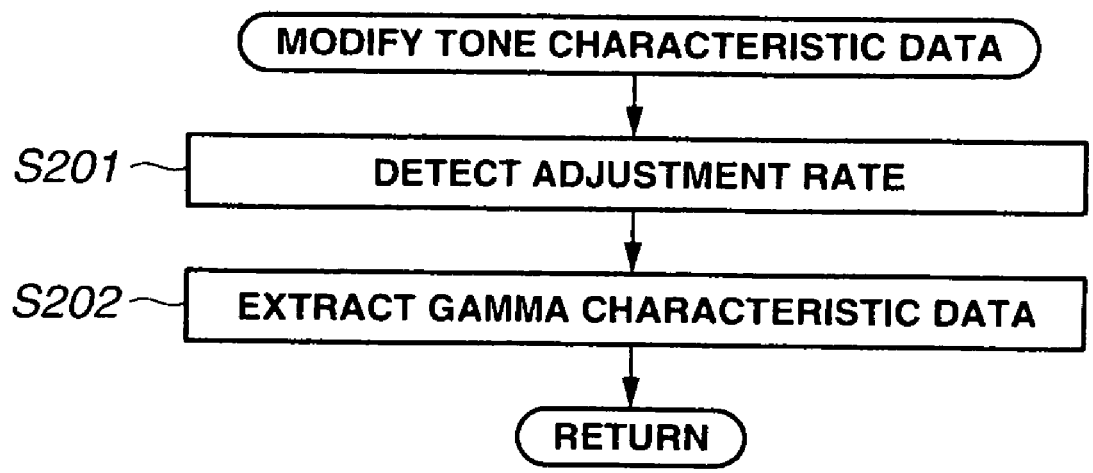
FIG. 17 is a flowchart showing details of a tone characteristic data modification process in step S13 of FIG. 16, in the above described Embodiment 2.

Next, FIG. 17 is a flowchart showing details of the tone characteristic data modification process in step S13 of FIG. 16. The process shown in FIG. 17 corresponds to the process performed in the above described tone characteristic modifying section 720.

When the process is started, first, the adjustment rate is manually or automatically set (step S201). Here, the manual setting of the adjustment rate is performed by designation from the user. Moreover, the automatic setting of the adjustment rate is performed, as described above, based on the area of the high luminance region or the count number of the high luminance image signal, as shown in FIG. 14.

Next, based on the adjustment rate set in step S201, the gamma characteristic data corresponding to the predetermined displaying apparatus is modified by performing the calculation as shown in Formula 4 (step S202).

If the process in step S202 is completed, subsequently, the process returns to the process shown in FIG. 16.

According to Embodiment 2 as described above, the γ characteristic data corresponding to the displaying apparatus is modified depending on the high luminance judgment result, and based on the modified γ characteristic data, the tone correction is applied to the image signal. Thus, it is possible to obtain the image signal which is appropriate for the displaying apparatus and in which the tone width has been extended in the high luminance region.

Then, since the γ characteristic data is modified by using the adjustment rate, the degree of the improvement of the image quality can be controlled by adjusting the adjustment rate.

As a result of performing such a process, the tone width of the low luminance region to the middle luminance region is compressed, and the contrast is degraded. However, in the present embodiment, subsequently, the space-variant tone correction is performed. Thus, also in the low luminance region to the middle luminance region, the contrast can be increased. As described above, while the whiteout is suppressed, an image signal with a good tone property in all tone regions can be obtained.

Moreover, after the tone conversion has been performed, the color shift reduction process is performed. Thus, a high-quality image signal in which a color shift has been suppressed can be obtained.

Embodiment 3

Figure 18:
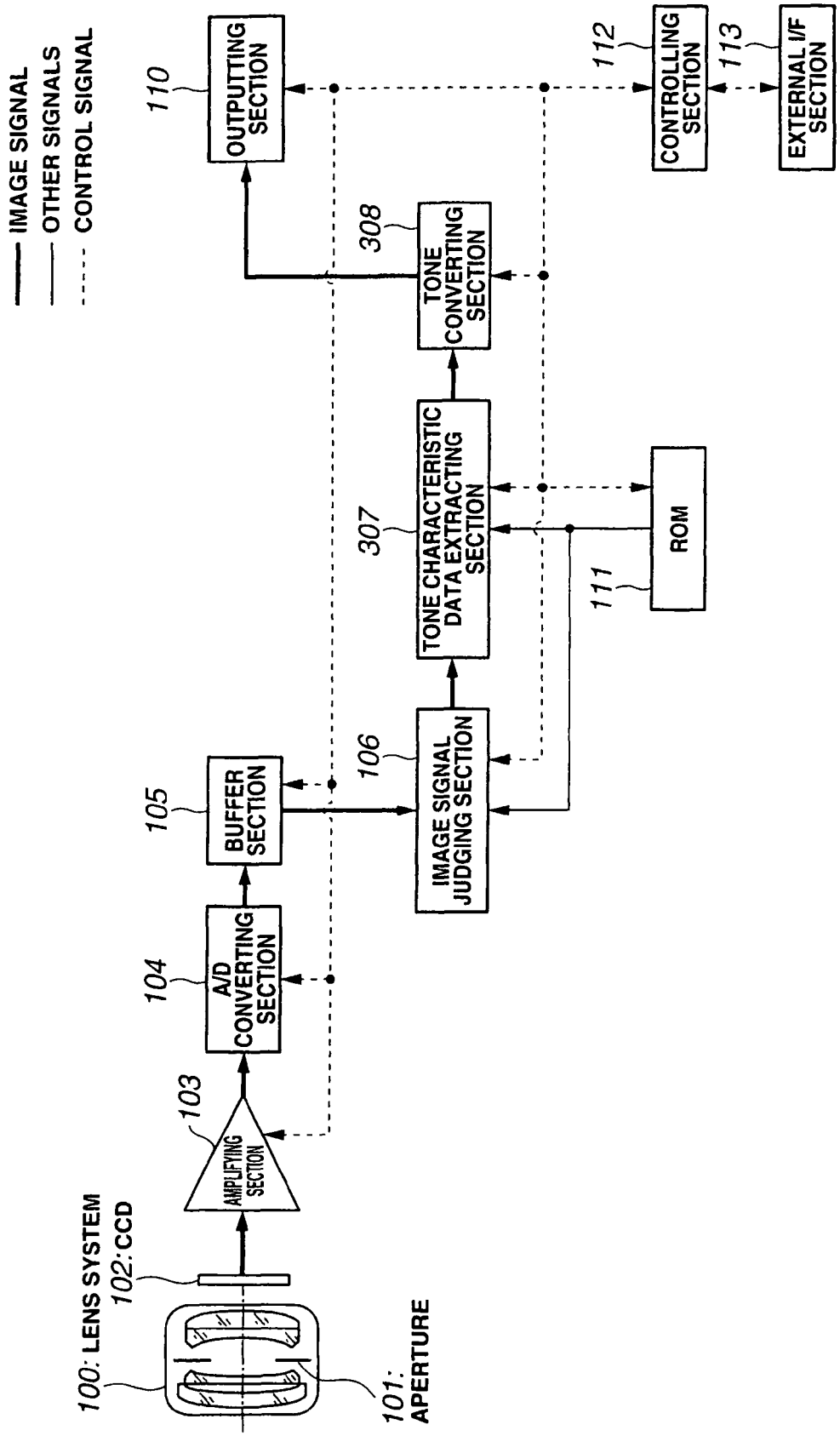
FIG. 18 is a block diagram showing a configuration of the image signal processing apparatus in Embodiment 3 of the present invention.

FIGS. 18 to 23 show Embodiment 3 of the present invention. FIG. 18 is a block diagram showing a configuration of the image signal processing apparatus.

In the Embodiment 3, the same reference numerals are attached to sections similar to the above described Embodiments 1 and 2, descriptions thereof are omitted, and mainly, only different points will be described.

The Embodiment 3 has a configuration in which, in the image signal processing apparatus shown in FIG. 1 of Embodiment 1, the tone characteristic data extracting section 107 is replaced with a tone characteristic data extracting section 307, and the tone converting section 108 is replaced with a tone converting section 308, respectively. Other basic configuration is similar to that of the above described Embodiment 1. For example, the configuration of the image signal judging section 106 is similar to the configuration shown in FIG. 2.

The image signal judging section 106 is connected to the outputting section 110 via the tone characteristic data extracting section 307 and the tone converting section 308. The ROM 111 is connected to the image signal judging section 106 and the tone characteristic data extracting section 307.

The controlling section 112 is bidirectionally connected to the tone characteristic data extracting section 307 and the tone converting section 308, so as to control the sections.

Next, an operation of the image signal processing apparatus as shown in FIG. 18 will be described along the flow of the image signal.

When the shutter button is depressed via the external I/F section 113, the image is picked up by the lens system 100, the aperture 101 and the CCD 102, and the image signal is outputted, amplified by the amplifying section 103, and converted into the digital signal by the A/D converting section 104.

The buffer section 105 stores the image signal transferred from the A/D converting section 104.

The image signal judging section 106 receives the threshold for judging the high luminance image signal (high luminance threshold) $ST1$, and a threshold for judging a low luminance image signal (low luminance threshold) $ST2$ (here, $ST1>ST2$), or reads $ST1$ and $ST2$ from the ROM 111, based on designation from the user, via the external I/F section 113 and the controlling section 112.

Next, similarly to the above described Embodiment 1, the image signal judging section 106 calculates the luminance value from the RGB image signal for each pixel (see Formula 1).

Subsequently, the image signal judging section 106 compares the luminance value calculated for each pixel with the high luminance threshold $ST1$. If the luminance value is larger than the high luminance threshold $ST1$, it is judged that the image signal of the above described pixel is the high luminance image signal. The image signal judging section 106 performs such comparison for all pixels included in the image, and counts the number of pixels judged as the high luminance image signal. Then, the image signal judging section 106 compares the value of the counter after all pixels have been processed, with the predetermined threshold read from the ROM 111. If the counter value is larger than the predetermined threshold, the high luminance judgment result is that the high luminance image signal exists in the image. If the counter value is less than or equal to the predetermined threshold, the high luminance judgment result is that the high luminance image signal does not exist in the image.

Similarly, the image signal judging section 106 compares the luminance value calculated for each pixel with the low luminance threshold $ST2$. If the luminance value is smaller than the low luminance threshold $ST2$, it is judged that the image signal of the above described pixel is the low luminance image signal. The image signal judging section 106 performs such comparison for all pixels included in the image, and counts the number of pixels judged as the low luminance image signal. Then, the image signal judging section 106 compares the value of the counter after all pixels have been processed, with the predetermined threshold read from the ROM 111. If the counter value is larger than the predetermined threshold, a low luminance judgment result is that the low luminance image signal exists in the image. If the counter value is less than or equal to the predetermined threshold, the low luminance judgment result is that the low luminance image signal does not exist in the image.

Then, the image signal judging section 106 transfers the image signal, the high luminance judgment result and the low luminance judgment result, as well as the high luminance threshold ST1 and the low luminance threshold ST2, to the tone characteristic data extracting section 307.

The tone characteristic data extracting section 307 extracts the γ characteristic data corresponding to the predetermined displaying apparatus from the ROM 111.

Figure 20:
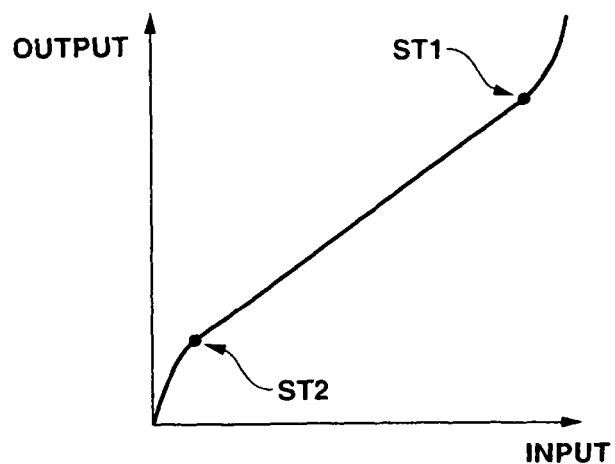
FIG. 20 is a diagram showing the tone characteristic data for the corrected tone process which is used when a high luminance image signal and a low luminance image signal exist, in the above described Embodiment 3.
Figure 21:
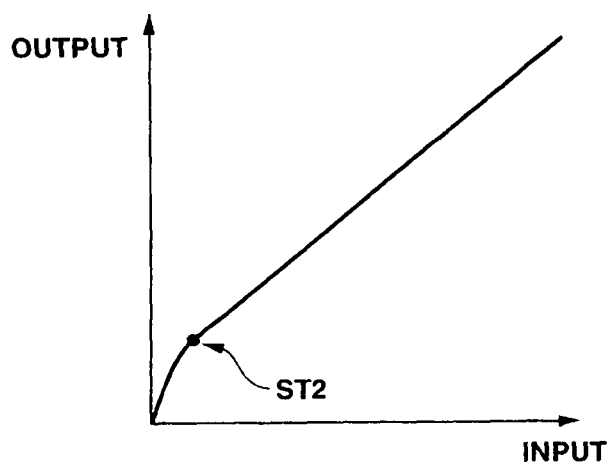
FIG. 21 is a diagram showing the tone characteristic data for the corrected tone process which is used when the high luminance image signal does not exist, and the low luminance image signal exists, in the above described Embodiment 3.
Figure 22:
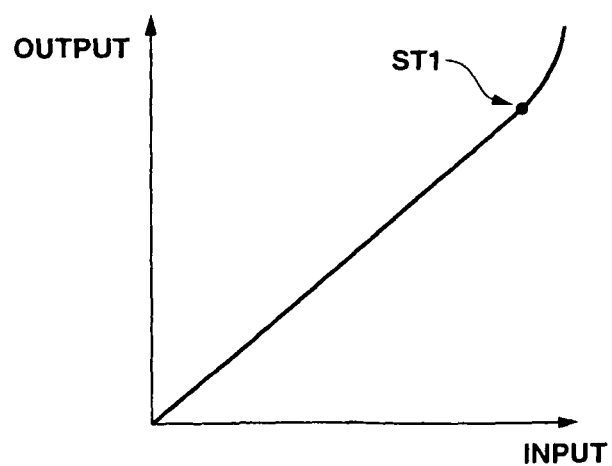
FIG. 22 is a diagram showing the tone characteristic data for the corrected tone process which is used when the high luminance image signal exists, and the low luminance image signal does not exist, in the above described Embodiment 3.

Moreover, based on the high luminance judgment result and the low luminance judgment result as well as the high luminance threshold ST1 and the low luminance threshold ST2, which have been transferred, the tone characteristic data extracting section 307 extracts any of corrected tone characteristic data as shown in FIG. 20, FIG. 21 or FIG. 22, as the tone characteristic data for the first corrected tone process, from the ROM 111.

Here, FIG. 20 is a diagram showing the tone characteristic data for the corrected tone process which is used when the high luminance image signal and the low luminance image signal exist. FIG. 21 is a diagram showing the tone characteristic data for the corrected tone process which is used when the high luminance image signal does not exist, and the low luminance image signal exists. FIG. 22 is a diagram showing the tone characteristic data for the corrected tone process which is used when the high luminance image signal exists, and the low luminance image signal does not exist. Then, it is assumed that a plurality of pieces, the number of which corresponds to the high luminance threshold ST1 or the low luminance threshold ST2, of the tone characteristic data for the corrected tone process as shown in FIGS. 20 to 22 have been previously saved respectively in the ROM 111.

Then, if the high luminance judgment result indicates that the high luminance image signal exists, and the low luminance judgment result indicates that the low luminance image signal exists, the tone characteristic data extracting section 307 extracts the tone characteristic data for the first corrected tone process as shown in FIG. 20, depending on the high luminance threshold ST1 and the low luminance threshold ST2, from the ROM 111.

Moreover, if the high luminance judgment result indicates that the high luminance image signal does not exist, and the low luminance judgment result indicates that the low luminance image signal exists, the tone characteristic data extracting section 307 extracts the tone characteristic data for the first corrected tone process as shown in FIG. 21, depending on the low luminance threshold ST2, from the ROM 111.

Furthermore, if the high luminance judgment result indicates that the high luminance image signal exists, and the low luminance judgment result indicates that the low luminance image signal does not exist, the tone characteristic data extracting section 307 extracts the tone characteristic data for the first corrected tone process as shown in FIG. 22, depending on the high luminance threshold ST1, from the ROM 111.

Then, the tone characteristic data extracting section 307 transfers the image signal transferred from the image signal judging section 106, the γ characteristic data, the high luminance judgment result and the low luminance judgment result, and the tone characteristic data for the corrected tone process as necessary, to the tone converting section 308.

Figure 19:
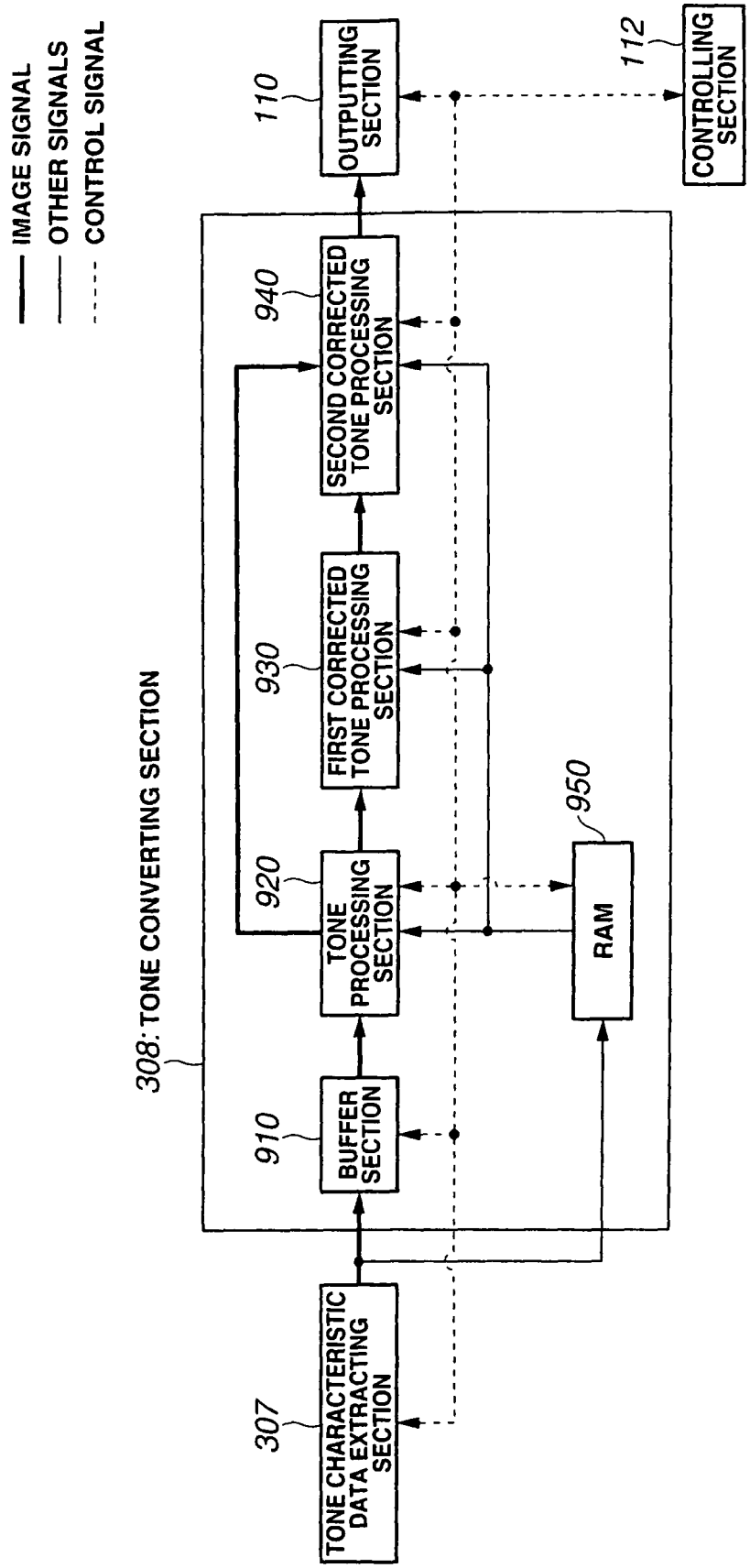
FIG. 19 is a block diagram showing an example of a configuration of the tone converting section in the above described Embodiment 3.

Next, FIG. 19 is a block diagram showing an example of a configuration of the tone converting section 308.

The tone converting section 308 is configured to have a buffer section 910, a tone processing section 920 which is the tone processing means, a first corrected tone processing section 930 which is the corrected tone processing means and the corrected tone converting means, a second corrected tone processing section 940 which is the corrected tone processing means, and a RAM 950.

The tone characteristic data extracting section 307 is connected to the buffer section 910 and the RAM 950. The buffer section 910 is connected to the tone processing section 920. The tone processing section 920 is connected to the first corrected tone processing section 930 and the second corrected tone processing section 940. The first corrected tone processing section 930 is connected to the second corrected tone processing section 940. The second corrected tone processing section 940 is connected to the outputting section 110. The RAM 950 is connected to the tone processing section 920, the first corrected tone processing section 930, and the second corrected tone processing section 940.

The controlling section 112 is bidirectionally connected to the buffer section 910, the tone processing section 920, the first corrected tone processing section 930, the second corrected tone processing section 940, and the RAM 950, so as to control the sections.

The image signal from the tone characteristic data extracting section 307 is saved in the buffer section 910. Moreover, the γ characteristic data, the tone characteristic data for the first corrected tone process, as well as the high luminance judgment result and the low luminance judgment result from the tone characteristic data extracting section 307 are saved in the RAM 950.

Similarly to the tone processing section 530 of the above described Embodiment 1, the tone processing section 920 performs the space-variant tone correction process for the image signal transferred from the buffer section 910. Next, the tone processing section 920 extracts the high luminance judgment result and the low luminance judgment result from the RAM 950. Then, based on the high luminance judgment result and the low luminance judgment result which have been extracted, if the tone processing section 920 has determined that at least one of the high luminance image signal and the low luminance image signal exists, the tone processing section 920 transfers the image signal after the tone correction process to the first corrected tone processing section 930. Moreover, if neither the high luminance image signal nor the low luminance image signal exists, the tone processing section 920 transfers the image signal after the tone correction process to the second corrected tone processing section 940.

If the image signal has been transferred from the tone processing section 920, the first corrected tone processing section 930 extracts the tone characteristic data for the first corrected tone process from the RAM 950, performs the first corrected tone process for the image signal, and transfers the processed image signal to the second corrected tone processing section 940.

The second corrected tone processing section 940 extracts the γ characteristic data corresponding to the displaying apparatus from the RAM 950, performs the second corrected tone process for the image signal transferred from the tone processing section 920 or the first corrected tone processing section 930 (see FIG. 4), and transfers the processed image signal to the outputting section 110.

The outputting section 110 performs the display on the displaying apparatus based on the image signal transferred from the tone converting section 308, or performs the recording in the recording medium such as a memory card, with the recording apparatus.

If the first corrected tone process is performed by using the tone characteristic data as shown in the above described FIGS. 20 to 22, the tone width of the image signal other than the high luminance region or the low luminance region can be compressed and the contrast can be degraded, due to the first corrected tone process. Consequently, in the tone converting section 308, before the first corrected tone process is performed by the first corrected tone processing section 930, the space-variant tone conversion process is first performed by the tone processing section 920 so as to perform the tone correction process for a picture generation process, and also, previously correct the degradation in the lightness and the contrast in the middle luminance region due to the subsequent first corrected tone process.

Then, the tone converting section 308 performs the first corrected tone process after the space-variant tone conversion process, expands the tone width of the high luminance region and the low luminance region, and restores the tone of the middle luminance region to a state before the tone correction process.

Furthermore, finally, the tone converting section 308 uses the γ characteristic data corresponding to the displaying apparatus to perform the second corrected tone process.

It should be noted that, also in the present embodiment, similarly to the above described Embodiments 1 and 2, the image signal processing apparatus in which the image pickup section is separate is possible, the image signal processing method is possible, or the computer may be caused to execute the image signal processing program to perform a similar process.

Figure 23:
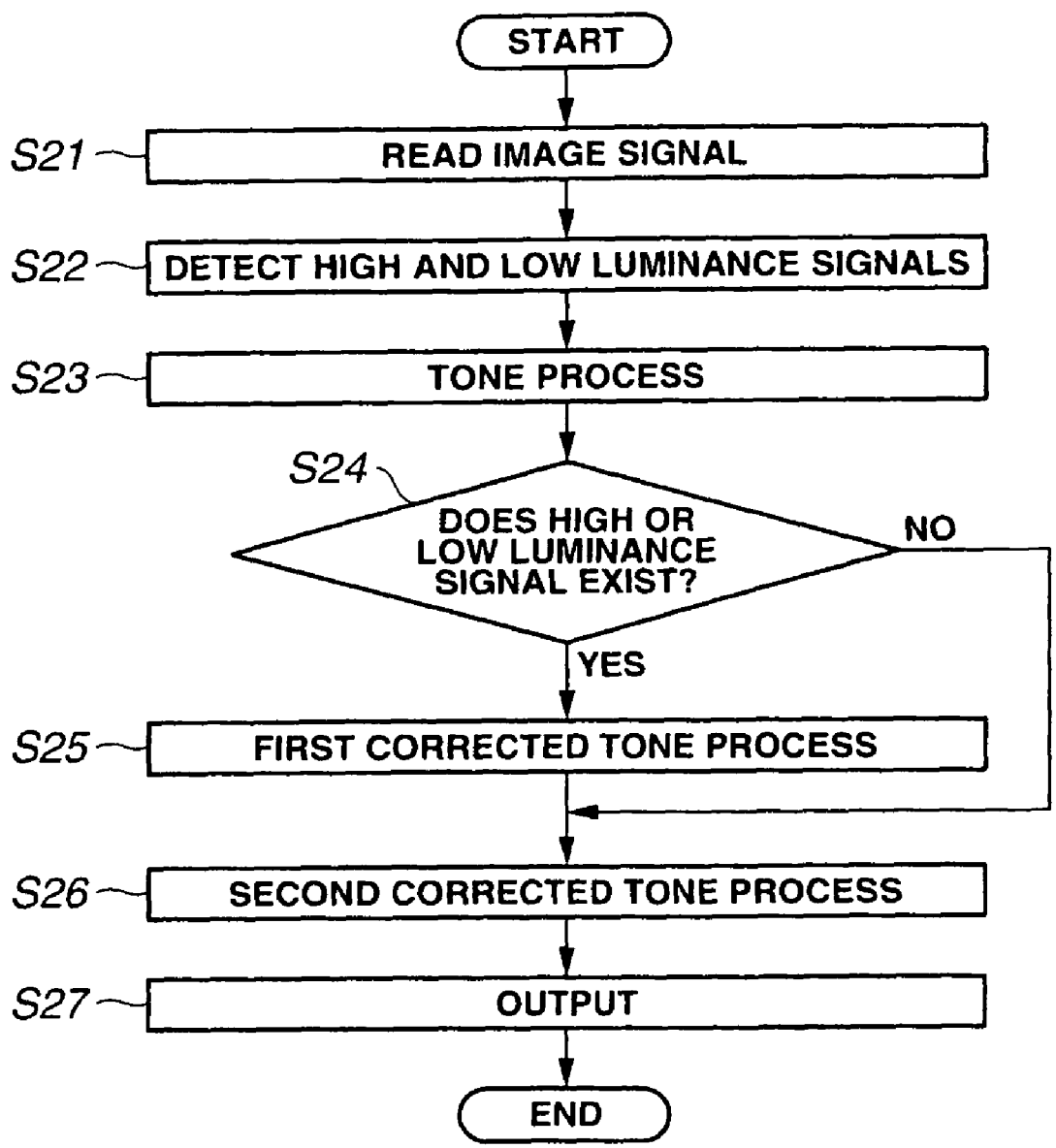
FIG. 23 is a flowchart showing a process by the image signal processing program of the above described Embodiment 3.

FIG. 23 is a flowchart showing a process by the image signal processing program.

When the process is started, first, similarly to step S1 of FIG. 9 or the like, the image signal and the information on the tone characteristic data and the like are read (step S21).

Next, detection of the high luminance image signal and detection of the low luminance image signal in the image signal are performed (step S22).

Subsequently, the correction coefficient for the space-variant tone conversion process is calculated for each pixel or for each region by using the image signal, the image signal is multiplied by the correction coefficient, and thereby the space-variant tone conversion process is performed (step S23).

Then, based on a result of the detection in step S22, it is judged whether or not the high luminance image signal exists in the image signal, and also it is judged whether or not the low luminance image signal exists in the image signal (step S24).

Here, if it has been determined that at least one of the high luminance image signal and the low luminance image signal exists, based on a result of the determination, and at least one of the high luminance threshold ST1 and the low luminance threshold ST2, any of the tone characteristic data for the first corrected tone process as shown in FIGS. 20 to 22 is extracted, and the first corrected tone process is performed (step S25).

If the process in step S25 is completed, or it has been determined in step S24 that both the high luminance image signal and the low luminance image signal do not exist, the second corrected tone process is performed by using the γ characteristic data corresponding to the predetermined displaying apparatus (step S26).

Subsequently, after the image signal after the tone conversion is outputted, and displayed on the displaying apparatus, or stored in the memory card or the like (step S27), the process is completed.

According to Embodiment 3 as described above, it is possible to improve the degradation in the contrast in the high luminance region and the low luminance region in the image (the whiteout and blackout) due to the γ characteristic data corresponding to the displaying apparatus, and it is possible to obtain the image signal with the good tone property.

It should be noted that the present invention is not directly limited to the above described embodiments, and in a practical phase, a constituent element can be varied and embodied within a range not deviating from the gist thereof. Moreover, an appropriate combination of a plurality of constituent elements disclosed in the above described embodiments can form various inventions. For example, several constituent elements may be deleted from all constituent elements shown in the embodiments. Furthermore, constituent elements across different embodiments may be combined as appropriate. As described above, of course, various variations or applications are possible within the range not deviating from the gist of the invention.

What is claimed is:

1. An image signal processing apparatus for performing an image signal process for an image signal, comprising:
    corrected tone processing means for correcting a tone characteristic so that a tone width of a specific luminance region in the image signal is extended; and
    tone processing means for correcting tone characteristics of all luminance regions in the image signal.

2. The image signal processing apparatus according to claim 1, wherein:
    one or more of the corrected tone processing means are provided, and at least one of the corrected tone processing means is disposed at a pre-stage of the tone processing means.

3. The image signal processing apparatus according to claim 1, wherein:
    one or more of the corrected tone processing means are provided, and at least one of the corrected tone processing means is disposed at a post-stage of the tone processing means.

4. The image signal processing apparatus according to claim 1, wherein:
    a plurality of the corrected tone processing means are provided, at least one of the plurality of the corrected tone processing means is disposed at a pre-stage of the tone processing means, and at least another one of the plurality of the corrected tone processing means is disposed at a post-stage of the tone processing means.

5. The image signal processing apparatus according to claim 1, wherein:
    the specific luminance region is at least one of a high luminance region and a low luminance region in the image signal.

6. The image signal processing apparatus according to claim 1, wherein:
    the corrected tone processing means is configured to have:
    tone characteristic data saving means for saving a plurality of pieces of tone characteristic data;
    detecting means for detecting information on the specific luminance region in the image signal;
    tone characteristic data extracting means for, based on the information on the specific luminance region detected by the detecting means, extracting one or more pieces of the tone characteristic data which extend the tone width of the specific luminance region, from the plurality of pieces of tone characteristic data; and
    corrected tone converting means for, based on the tone characteristic data extracted by the tone characteristic data extracting means, performing corrected tone conversion for the image signal.

7. The image signal processing apparatus according to claim 6, wherein:
the detecting means is configured to have threshold designating means for designating a threshold for judging the specific luminance region in the image signal, specifies the specific luminance region based on the threshold, and detects the information on the specific region.

8. The image signal processing apparatus according to claim 7, wherein:
the specific luminance region is a high luminance region and a low luminance region in the image signal,
the threshold designating means designates a high luminance threshold indicating a lower limit of the high luminance region, and a low luminance threshold which is a value smaller than the high luminance threshold and indicates an upper limit of the low luminance region, and
the detecting means detects a region having a luminance value larger than the high luminance threshold, as the high luminance region as the specific luminance region, and also detects a region having a luminance value smaller than the low luminance threshold, as the low luminance region as the specific luminance region.

9. The image signal processing apparatus according to claim 7, wherein:
the threshold designating means is configured to have threshold user-designating means for designating the threshold by a user input.

10. The image signal processing apparatus according to claim 7, wherein:
the threshold designating means is configured to have automatic threshold designating means for calculating and automatically designating the threshold.

11. The image signal processing apparatus according to claim 10, wherein:
the tone characteristic data saving means further saves tone characteristic data of a predetermined displaying apparatus, and
the automatic threshold designating means is configured to have:
analyzing means for analyzing the tone characteristic data of the predetermined displaying apparatus; and
threshold calculating means for calculating the threshold based on a result of the analysis by the analyzing means.

12. The image signal processing apparatus according to claim 6, wherein:
the corrected tone processing means is configured to further have tone characteristic modifying means for modifying the tone characteristic data extracted by the tone characteristic data extracting means, and
the corrected tone converting means performs the corrected tone conversion for the image signal based on the tone characteristic data extracted by the tone characteristic data extracting means and modified by the tone characteristic modifying means.

13. The image signal processing apparatus according to claim 12, wherein:
the tone characteristic modifying means is configured to have adjustment rate extracting means for extracting an adjustment rate indicating a degree of the modification of the tone characteristic data extracted by the tone characteristic data extracting means, and modifies the tone characteristic data extracted by the tone characteristic data extracting means, based on the adjustment rate.

14. The image signal processing apparatus according to claim 13, wherein:
the adjustment rate extracting means is configured to have adjustment rate user-designating means for designating the adjustment rate by a user input.

15. The image signal processing apparatus according to claim 13, wherein:
the adjustment rate extracting means is configured to have automatic adjustment rate designating means for calculating and automatically designating the adjustment rate based on the image signal.

16. The image signal processing apparatus according to claim 15, wherein:
the automatic adjustment rate designating means designates the adjustment rate based on at least one of information on an area of the specific luminance region and information on the number of pixels included in the specific luminance region.

17. The image signal processing apparatus according to claim 1, wherein:
the tone processing means is configured to have:
correction coefficient calculating means for calculating a correction coefficient for performing a space-variant tone process; and
tone converting means for performing space-variant tone conversion for the image signal by using the correction coefficient.

18. The image signal processing apparatus according to claim 1, further comprising:
image quality degradation information obtaining means for obtaining image quality degradation information from the image signal for which a process by the corrected tone processing means and a process by the tone processing means have been performed; and
image quality correcting means for correcting the image signal for which the process by the corrected tone processing means and the process by the tone processing means have been performed, based on the image quality degradation information.

19. The image signal processing apparatus according to claim 18, wherein:
the image quality degradation information obtaining means is configured to have noise detecting means for detecting a noise as the image quality degradation information, and
the image quality correcting means is configured to have noise reducing means for performing a noise reduction process for the image signal for which the process by the corrected tone processing means and the process by the tone processing means have been performed.

20. The image signal processing apparatus according to claim 18, wherein:
the image quality degradation information obtaining means is configured to have color shift detecting means for detecting a color shift as the image quality degradation information, and
the image quality correcting means is configured to have color shift reducing means for performing a process for reducing the color shift, for the image signal for which the process by the corrected tone processing means and the process by the tone processing means have been performed.

21. A non-transitory computer-readable storage medium having an image signal processing program stored thereon for causing a computer to perform an image signal process for an image signal, wherein the program controls the computer to perform:

a corrected tone processing step of correcting a tone characteristic so that a tone width of a specific luminance region in the image signal is extended; and a tone processing step of correcting tone characteristics of all luminance regions in the image signal.

22. The computer-readable storage medium according to claim 21, wherein:

the program further controls the computer to perform:

an image quality degradation information obtaining step of obtaining image quality degradation information from the image signal for which the corrected tone processing step and the tone processing step have been performed; and an image quality correcting step of correcting the image signal for which the corrected tone processing step and the tone processing step have been performed, based on the image quality degradation information.

23. An image signal processing method for performing an image signal process for an image signal, comprising:

a corrected tone processing step of correcting a tone characteristic so that a tone width of a specific luminance region in the image signal is extended; and a tone processing step of correcting tone characteristics of all luminance regions in the image signal.

24. The image signal processing method according to claim 23, further comprising:

an image quality degradation information obtaining step of obtaining image quality degradation information from the image signal for which the corrected tone processing step and the tone processing step have been performed; and an image quality correcting step of correcting the image signal for which the corrected tone processing step and the tone processing step have been performed, based on the image quality degradation information.

* * * * *